US012325891B2

(12) United States Patent
Takatani et al.

(10) Patent No.: US 12,325,891 B2
(45) Date of Patent: Jun. 10, 2025

(54) METHOD FOR PRODUCING GRAIN ORIENTED ELECTRICAL STEEL SHEET

(71) Applicant: NIPPON STEEL CORPORATION, Tokyo (JP)

(72) Inventors: Shinsuke Takatani, Tokyo (JP); Yoshiyuki Ushigami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 841 days.

(21) Appl. No.: 17/422,039

(22) PCT Filed: Jan. 16, 2020

(86) PCT No.: PCT/JP2020/001143
§ 371 (c)(1),
(2) Date: Jul. 9, 2021

(87) PCT Pub. No.: WO2020/149323
PCT Pub. Date: Jul. 23, 2020

(65) Prior Publication Data
US 2022/0098693 A1 Mar. 31, 2022

(30) Foreign Application Priority Data

Jan. 16, 2019 (JP) .................................. 2019-005132

(51) Int. Cl.
*C21D 9/46* (2006.01)
*C21D 8/12* (2006.01)
(Continued)

(52) U.S. Cl.
CPC ............. *C21D 9/46* (2013.01); *C21D 8/1222* (2013.01); *C21D 8/1233* (2013.01);
(Continued)

(58) Field of Classification Search
CPC ......... C22C 38/02; C22C 38/04; C22C 38/06; C21D 1/76; C23C 22/74; C23C 22/00; H01F 1/18
See application file for complete search history.

(56) References Cited

U.S. PATENT DOCUMENTS 3,932,236 A 1/1976 Wada et al.
5,129,965 A 7/1992 Kobayashi et al.
(Continued)

FOREIGN PATENT DOCUMENTS

CN 107429307 A 12/2017
JP 49-96920 A 9/1974
(Continued)

OTHER PUBLICATIONS

JFE Steel Corporation, "Method for Producing Grain-Oriented Electrical Steel Sheets", Complete Specification for 3108/KOLNP/ 2015, Feb. 12, 2016, pp. 1-28 (29 pages total).
(Continued)

*Primary Examiner* — Anthony M Liang
*Assistant Examiner* — Jacob J Gusewelle
(74) *Attorney, Agent, or Firm* — Birch, Stewart, Kolasch & Birch, LLP

(57) ABSTRACT

A method for producing a grain oriented electrical steel sheet includes a decarburization annealing process where an oxidation degree $PH_2O/PH_2$ is controlled, an annealing separator applying process where a mass ratio of MgO and $Al_2O_3$ in an annealing separator is controlled, a final annealing process where hydrogen in mixed gas atmosphere is controlled to 50 volume % or more, an annealing separator removing process where water-washing is conducted using solution with inhibitor and then pickling is conducted, a smoothing process where mixed gas and temperature are controlled for annealing, and an insulation coating forming
(Continued)

process where a baking temperature and a heat treatment temperature are controlled.

6 Claims, 1 Drawing Sheet

(51) Int. Cl.
*C22C 38/00* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/54* (2006.01)
*C22C 38/60* (2006.01)

(52) U.S. Cl.
CPC ......... *C21D 8/1255* (2013.01); *C21D 8/1261* (2013.01); *C21D 8/1266* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *C21D 2201/05* (2013.01)

(56) References Cited

U.S. PATENT DOCUMENTS

| | | | | |
|---|---|---|---|---|
| 5,853,499 A | * | 12/1998 | Komatsubara | C21D 3/04 148/113 |
| 6,488,784 B1 | * | 12/2002 | Fortunati | C22C 38/02 148/111 |
| 2003/0188806 A1 | | 10/2003 | Fujii et al. | |
| 2005/0217761 A1 | * | 10/2005 | Ushigami | C21D 8/1283 148/111 |
| 2015/0170813 A1 | | 6/2015 | Shingaki et al. | |
| 2015/0318094 A1 | | 11/2015 | Shingaki et al. | |
| 2018/0282830 A1 | | 10/2018 | Tada et al. | |
| 2020/0087746 A1 | | 3/2020 | Omura et al. | |
| 2020/0123017 A1 | | 4/2020 | Migita et al. | |
| 2020/0123632 A1 | | 4/2020 | Takatani et al. | |
| 2020/0208235 A1 | | 7/2020 | Yamamoto et al. | |
| 2021/0054489 A1 | | 2/2021 | Tanaka et al. | |
| 2021/0202143 A1 | | 7/2021 | Kwon et al. | |
| 2021/0317542 A1 | | 10/2021 | Nakamura et al. | |

FOREIGN PATENT DOCUMENTS

| | | | |
|---|---|---|---|
| JP | 4-80322 A | | 3/1992 |
| JP | H04-232212 A | | 8/1992 |
| JP | H-05043943 A | * | 2/1993 |
| JP | 5-279864 A | | 10/1993 |
| JP | 6-99812 A | | 12/1994 |
| JP | 8-269573 A | | 10/1996 |
| JP | H-08269573 A | * | 10/1996 |
| JP | 9-49027 A | | 2/1997 |
| JP | 10-130726 A | | 5/1998 |
| JP | 10-130727 A | | 5/1998 |
| JP | 2003-055717 A | | 2/2003 |
| JP | 2003-268450 A | | 9/2003 |
| JP | 4184809 B2 | | 11/2008 |
| JP | 2018-028140 A | | 2/2018 |
| WO | WO 02/088403 A1 | | 11/2002 |
| WO | WO 2017/111505 A1 | | 6/2017 |
| WO | WO 2017/169854 A1 | | 10/2017 |
| WO | WO 2018/110676 A1 | | 6/2018 |

OTHER PUBLICATIONS

Kobayashi et al., machine translation of JPH-04232212-A, 1992.
Krenke et al., machine translation of DE-102014104106-A1, 2015.
Migita et al., machine translation of WO-2017/169852-A1, 2017.
Nakamura et al., machine translation of JP-2017095771-A, 2017.
Takeda et al., machine translation of JP-2000-038615-A, 2000.
U.S. Appl. No. 17/422,390, filed Jul. 12, 2021.

* cited by examiner

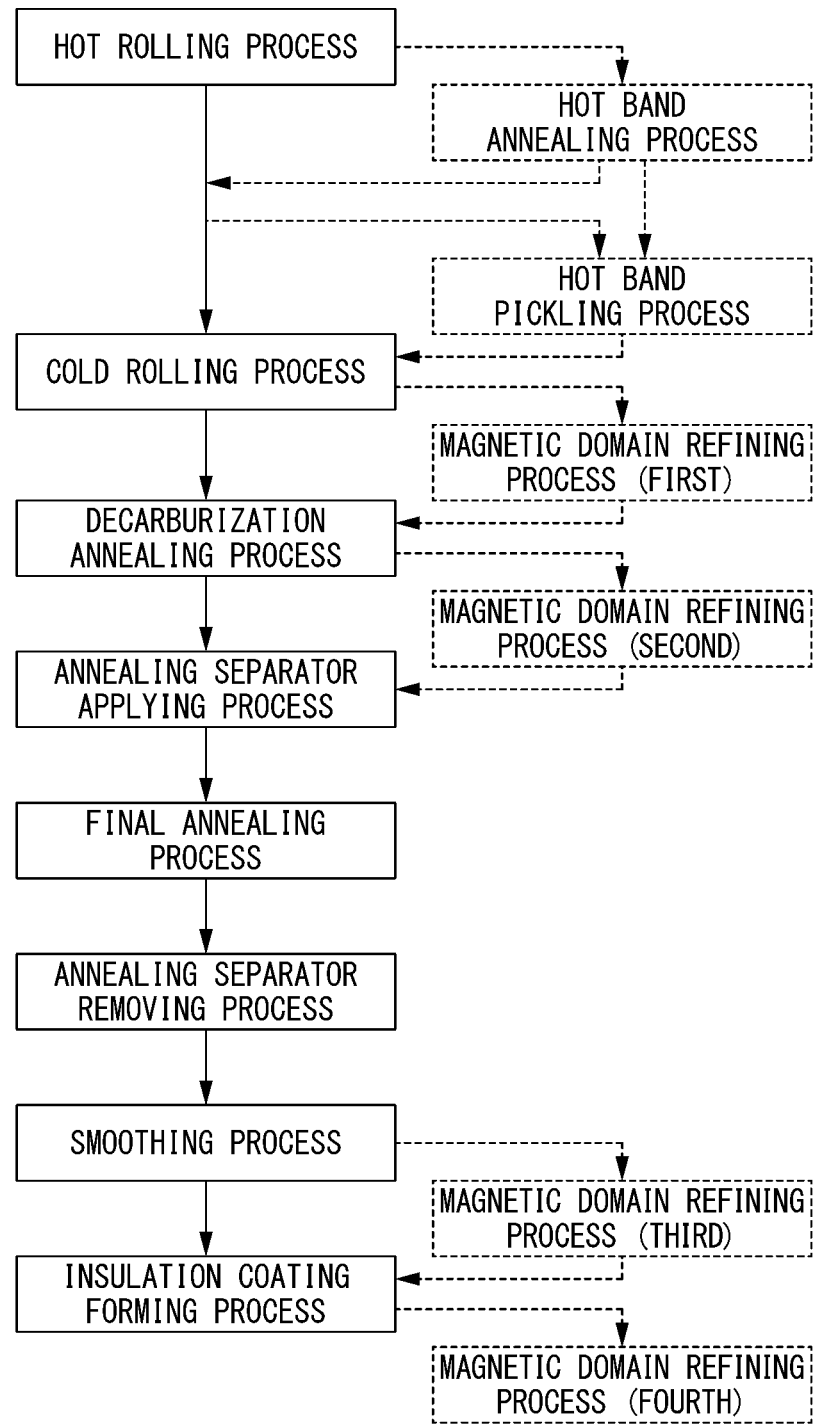

METHOD FOR PRODUCING GRAIN ORIENTED ELECTRICAL STEEL SHEET

TECHNICAL FIELD

The present invention relates to a method for producing a grain oriented electrical steel sheet.

Priority is claimed on Japanese Patent Application No. 2019-005132, filed on Jan. 16, 2019, and the content of which is incorporated herein by reference.

BACKGROUND ART

A grain oriented electrical steel sheet is used mainly in a transformer. A transformer is continuously excited over a long period of time from installation to disuse such that energy loss continuously occurs. Therefore, energy loss occurring when the transformer is magnetized by an alternating current, that is, iron loss is a main index that determines the performance of the transformer.

In order to reduce iron loss of a grain-oriented electrical steel sheet, various methods have been developed. Examples of the methods include a method of highly aligning grains in the {110}<001> orientation called Goss orientation in a crystal structure, a method of increasing the content of a solid solution element such as Si that increases electric resistance in a steel sheet, and a method of reducing the thickness of a steel sheet.

In addition, it is known that a method of applying tension to a steel sheet is effective for reducing iron loss. Thus, in general, in order to reduce the iron loss, an insulation coating is formed on a surface of the grain oriented electrical steel sheet. The coating applies the tension to the grain oriented electrical steel sheet, and thereby, reduces the iron loss as a single steel sheet. Moreover, the coating ensures interlaminar electrical insulation when the grain oriented electrical steel sheets are utilized after being laminated, and thereby, reduces the iron loss as an iron core.

For instance, as the grain oriented electrical steel sheet with the coating, a forsterite film which is an oxide film including Mg is formed on a surface of a base steel sheet, and then, the insulation coating is formed on a surface of the forsterite film. In the case, the coating on the base steel sheet includes the forsterite film and the insulation coating. The forsterite film and the insulation coating respectively have a function of increasing the electrical insulation and applying the tension to the base steel sheet.

The forsterite film which is the oxide film including Mg is formed, during final annealing which is a heat treatment at 900 to 1200° C. for 30 hours or more to make the steel sheet be secondary-recrystallized, by reacting an annealing separator mainly including magnesia (MgO) with silicon dioxide ($SiO_2$) formed on the base steel sheet during decarburization annealing.

The insulation coating is formed by applying coating solution including, for instance, phosphoric acid or phosphate, colloidal silica, and chromic anhydride or chromate to the base steel sheet after final annealing, and by baking and drying it at 300 to 950° C. for 10 seconds or more.

In order that the coating ensures the function of increasing the insulation and applying the tension to the base steel sheet, sufficient adhesion is required between the coating and the base steel sheet.

Conventionally, the above adhesion has been mainly ensured by the anchor effect derived from the unevenness of an interface between the base steel sheet and the forsterite film. However, in recent years, it has been found that the unevenness of the interface becomes an obstacle of movement of a magnetic domain wall when the grain oriented electrical steel sheet is magnetized, and thus, the unevenness is also a factor that hinders the reduction of iron loss.

For instance, Japanese Unexamined Patent Application, First Publication No. S49-096920 (Patent Document 1) and PCT International Publication No. WO2002/088403 (Patent Document 2) disclose a technique to ensure the adhesion of the insulation coating even in a state in which the forsterite film which is the oxide film including Mg does not exist and the interface is smooth in order to further reduce the iron loss.

In the method for producing the grain oriented electrical steel sheet as disclosed in the Patent Document 1, the forsterite film is removed by pickling or the like and then the surface of the base steel sheet is smoothened by chemical polishing or electrolytic polishing. In the method for producing the grain oriented electrical steel sheet as disclosed in the Patent Document 2, the formation of the forsterite film itself is suppressed by using an annealing separator containing alumina ($Al_2O_3$) for the final annealing and thereby the surface of the base steel sheet is smoothened.

However, in the producing methods as disclosed in the Patent Document 1 and the Patent Document 2, there is a problem that the insulation coating is difficult to adhere to the surface of the base steel sheet (sufficient adhesion is not obtained) in a case where the insulation coating is formed in contact with the surface of the base steel sheet (directly on the surface of the base steel sheet).

RELATED ART DOCUMENTS

Patent Documents

[Patent Document 1] Japanese Unexamined Patent Application, First Publication No. S49-096920
[Patent Document 2] PCT International Publication No. WO2002/088403

SUMMARY OF INVENTION

Technical Problem to be Solved

The present invention has been made in consideration of the above mentioned situations. An object of the invention is to provide a method for producing a grain oriented electrical steel sheet without the forsterite film and excellent in magnetic characteristics (in particular, iron loss) and the coating adhesion.

Solution to Problem

The present inventors have investigated a technique to improve the adhesion (coating adhesion) between the steel sheet and the insulation coating even in a case where the forsterite film is not formed for reducing the iron loss and the insulation coating is formed on the surface of the grain oriented electrical steel sheet in which the surface of the steel sheet is smoothened.

As a result, it has been found that it is possible to produce the grain oriented electrical steel sheet without the forsterite film and excellent in the magnetic characteristics and the coating adhesion by appropriately combining predetermined processes.

An aspect of the present invention employs the following.

(1) A method for producing a grain oriented electrical steel sheet according to an aspect of the present invention includes:
- a hot rolling process of hot-rolling a steel piece to obtain a hot rolled steel sheet, the steel piece including, as a chemical composition, by mass %,
- 0.030 to 0.100% of C,
- 0.80 to 7.00% of Si,
- 0.01 to 1.00% of Mn,
- 0 to 0.060% in total of S and Se,
- 0.010 to 0.065% of acid soluble Al,
- 0.004 to 0.012% of N,
- 0 to 0.30% of Cr,
- 0 to 0.40% of Cu,
- 0 to 0.50% of P,
- 0 to 0.30% of Sn,
- 0 to 0.30% of Sb,
- 0 to 1.00% of Ni,
- 0 to 0.008% of B,
- 0 to 0.15% of V,
- 0 to 0.20% of Nb,
- 0 to 0.10% of Mo,
- 0 to 0.015% of Ti,
- 0 to 0.010% of Bi, and
- a balance consisting of Fe and impurities;
- a cold rolling process of cold-rolling the hot rolled steel sheet to obtain a cold rolled steel sheet;
- a decarburization annealing process of decarburization-annealing the cold rolled steel sheet to obtain a decarburization annealed sheet;
- an annealing separator applying process of applying and drying an annealing separator including $Al_2O_3$ and MgO to the decarburization annealed sheet;
- a final annealing process of final-annealing the decarburization annealed sheet after applying the annealing separator to obtain a final annealed sheet;
- an annealing separator removing process of removing a redundant annealing separator from a surface of the final annealed sheet;
- a smoothing process of smoothing the surface of the final annealed sheet after removing the redundant annealing separator; and
- an insulation coating forming process of forming an insulation coating on the surface of the final annealed sheet after being smoothed,
- wherein, in the decarburization annealing process, $PH_2O/PH_2$ which is an oxidation degree of an atmosphere is 0.18 to 0.80, an annealing temperature is 750 to 900° C., and a holding is 10 to 600 seconds,
- wherein, in the annealing separator applying process, $MgO/(MgO+Al_2O_3)$ which is a mass ratio of MgO and $Al_2O_3$ is 5 to 50%, and a hydration water is 1.5 mass % or less in the annealing separator,
- wherein, in the final annealing process,
- the decarburization annealed sheet after applying the annealing separator is held at 1100 to 1200° C. for 10 hours or more in a mixed gas atmosphere including 50 volume % or more of a hydrogen,
- wherein, in the annealing separator removing process,
- the final annealed sheet is water-washed using a solution with an inhibitor which is at least one of a triethanolamine, a rosinamine, or a mercaptan,
- the final annealed sheet after water-washing is pickled using an acidic solution whose volume concentration is less than 20%, and
- an amount of an iron hydroxide and an iron oxide on the surface of the final annealed sheet is controlled to 0.9 g/m² or less per a side,
- wherein, in the smoothing process,
- the final annealed sheet after removing the redundant annealing separator is annealed at 1000° C. or more in a mixed gas atmosphere including 50 volume % or more of a hydrogen or a carbon monoxide, and
- wherein, in the insulation coating forming process,
- the insulation coating is formed on the surface of the final annealed sheet after being smoothed by applying an insulation coating forming solution which mainly includes a phosphate or a colloidal silica, by baking at 350 to 600° C., and then by heat-treating at 800 to 1000° C.

(2) The method for producing the grain oriented electrical steel sheet according to (1) may include,
- between the hot rolling process and the cold rolling process,
- at least one of a hot band annealing process of annealing the hot rolled steel sheet or a hot band pickling process of pickling the hot rolled steel sheet.

(3) In the method for producing the grain oriented electrical steel sheet according to (1) or (2),
- in the decarburization annealing process, a nitriding treatment may be conducted by annealing the cold rolled steel sheet in an atmosphere including ammonia.

(4) The method for producing the grain oriented electrical steel sheet according to any one of (1) to (3) may include,
- between the cold rolling process and the decarburization annealing process, between the decarburization annealing process and the annealing separator applying process, between the smoothing process and the insulation coating forming process, or after the insulation coating forming process,
- a magnetic domain refining process of conducting a magnetic domain refining treatment.

(5) In the method for producing the grain oriented electrical steel sheet according to any one of (1) to (4),
- the steel piece may include, as the chemical composition, by mass %, at least one selected from a group consisting of
- 0.02 to 0.30% of Cr,
- 0.05 to 0.40% of Cu,
- 0.005 to 0.50% of P,
- 0.02 to 0.30% of Sn,
- 0.01 to 0.30% of Sb,
- 0.01 to 1.00% of Ni,
- 0.0005 to 0.008% of B,
- 0.002 to 0.15% of V,
- 0.005 to 0.20% of Nb,
- 0.005 to 0.10% of Mo,
- 0.002 to 0.015% of Ti, and
- 0.001 to 0.010% of Bi.

Effects of Invention

According to the above aspects of the present invention, it is possible to provide the method for producing the grain oriented electrical steel sheet without the forsterite film and excellent in the magnetic characteristics and the coating adhesion.

BRIEF DESCRIPTION OF DRAWINGS

FIG. 1 is a flow chart illustrating a method for producing a grain oriented electrical steel sheet according to an embodiment of the present invention.

DETAILED DESCRIPTION OF PREFERRED EMBODIMENTS

Hereinafter, a preferable embodiment of the present invention is described in detail. However, the present invention is not limited only to the configuration which is disclosed in the embodiment, and various modifications are possible without departing from the aspect of the present invention. In addition, the limitation range as described in the embodiment includes a lower limit and an upper limit thereof. However, the value expressed by "more than" or "less than" does not include in the limitation range. "%" of the amount of respective elements expresses "mass %".

A method for producing a grain oriented electrical steel sheet according to an embodiment of the present invention (hereinafter, referred to as "the method for producing the grain oriented electrical steel sheet according to the embodiment") is the method for producing the grain oriented electrical steel sheet without a forsterite film and includes the following processes.

(i) Hot rolling process of hot-rolling a steel piece including predetermined chemical composition to obtain a hot rolled steel sheet.

(ii) Cold rolling process of cold-rolling the hot rolled steel sheet by cold-rolling once or by cold-rolling plural times with an intermediate annealing to obtain a cold rolled steel sheet.

(iii) Decarburization annealing process of decarburization-annealing the cold rolled steel sheet to obtain a decarburization annealed sheet.

(iv) Annealing separator applying process of applying and drying an annealing separator including $Al_2O_3$ and MgO to the decarburization annealed sheet.

(v) Final annealing process of final-annealing the decarburization annealed sheet after applying the annealing separator to obtain a final annealed sheet.

(vi) Annealing separator removing process of removing a redundant annealing separator from a surface of the final annealed sheet by a method including water-washing and pickling.

(vii) Smoothing process of smoothing the surface of the final annealed sheet after removing the redundant annealing separator.

(viii) Insulation coating forming process of forming an insulation coating on the surface of the final annealed sheet after being smoothed.

In addition, the method for producing the grain oriented electrical steel sheet according to the embodiment may further include the following processes.

(I) Hot band annealing process of annealing the hot rolled steel sheet.

(II) Hot band pickling process of pickling the hot rolled steel sheet.

(III) Magnetic domain refining process of conducting a magnetic domain refining treatment.

In the method for producing the grain oriented electrical steel sheet according to the embodiment, it is necessary to control not only one process in the above processes but each of the above processes comprehensively and inseparably. Only when the predetermined conditions in each of all processes as explained above are controlled, it is possible to reduce the iron loss and improve the coating adhesion.

Hereinafter, each process is described in detail.

<Hot Rolling Process>

In the hot rolling process, the steel piece is hot-rolled to obtain the hot rolled steel sheet, the steel piece including, as the chemical composition, by mass %, 0.030 to 0.100% of C,
0.80 to 7.00% of Si,
0.01 to 1.00% of Mn,
0 to 0.060% in total of S and Se,
0.010 to 0.065% of acid soluble Al,
0.004 to 0.012% of N,
0 to 0.30% of Cr,
0 to 0.40% of Cu,
0 to 0.50% of P,
0 to 0.30% of Sn,
0 to 0.30% of Sb,
0 to 1.00% of Ni,
0 to 0.008% of B,
0 to 0.15% of V,
0 to 0.20% of Nb,
0 to 0.10% of Mo,
0 to 0.015% of Ti,
0 to 0.010% of Bi, and
a balance consisting of Fe and impurities. In the embodiment, the steel sheet after the hot rolling process is referred to as the hot rolled steel sheet.

The method for making the steel piece (slab) to be used in the hot rolling process is not limited. For instance, molten steel with predetermined chemical composition may be made, and the slab may be made by using the molten steel. The slab may be made by continuous casting. An ingot may be made by using the molten steel, and then, the slab may be made by blooming the ingot. Moreover, the slab may be made by other methods.

A thickness of the slab is not particularly limited. The thickness of the slab may be 150 to 350 mm for instance. The thickness of the slab is preferably 220 to 280 mm. The slab with the thickness of 10 to 70 mm which is a so-called thin slab may be used.

Limitation reasons of the chemical composition of the steel piece are explained. Hereinafter, "%" of the chemical composition represents "mass %".

(0.030 to 0.100% of C)

C (carbon) is an element effective in controlling the primary recrystallized structure, but negatively affective in the magnetic characteristics. Thus, C is the element to be removed by decarburization annealing before final annealing. When the C content is more than 0.100%, a time for decarburization annealing needs to be prolonged, and the productivity decreases. Thus, the C content is to be 0.100% or less. The C content is preferably 0.085% or less, and more preferably 0.070% or less.

It is favorable that the C content is lower. However, when considering the productivity in industrial production and the magnetic characteristics of the product, the lower limit of the C content is substantially 0.030%.

(0.80 to 7.00% of Si)

Si (silicon) increases the electric resistance of grain oriented electrical steel sheet, and thereby, reduces the iron loss. When the Si content is less than 0.80%, γ transformation occurs during the final annealing and the crystal orientation of grain oriented electrical steel sheet is impaired.

Thus, the Si content is to be 0.80% or more. The Si content is preferably 2.00% or more, and more preferably 2.50% or more.

On the other hand, when the Si content is more than 7.00%, the cold workability deteriorates and the cracks tend to occur during cold rolling. Thus, the Si content is to be 7.00% or less. The Si content is preferably 4.50% or less, and more preferably 4.00% or less.

(0.01 to 1.00% of Mn)

Mn (manganese) increases the electric resistance of grain oriented electrical steel sheet, and thereby, reduces the iron loss. Moreover, Mn forms MnS and/or MnSe which act as the inhibitor by bonding to S and/or Se. When the Mn content is within 0.01 to 1.00%, the secondary recrystallization becomes stable. Thus, the Mn content is to be 0.01 to 1.00%. The lower limit of the Mn content is preferably 0.08%, and more preferably 0.09%. The upper limit of the Mn content is preferably 0.50%, and more preferably 0.20%.

(0 to 0.060% in Total of One or Both of S and Se)

S (sulfur) and Se (selenium) are elements to form MnS and/or MnSe which act as the inhibitor by bonding to Mn.

When the total amount of one or both of S and Se (S+Se) is more than 0.060%, the dispersion state of precipitation of MnS and/or MnSe becomes uneven. In the case, the desired secondary recrystallized structure cannot be obtained, and the magnetic flux density may decrease. Moreover, MnS remains in the steel after purification annealing, and the hysteresis loss may increase. Thus, the total amount of S and Se is to be 0.060% or less.

The lower limit of the total amount of S and Se is not particularly limited, and may be 0%. The lower limit thereof may be 0.003%. When the inhibitor thereof is used, the lower limit is preferably 0.015%.

(0.010 to 0.065% of Acid Soluble Al (Sol. Al))

The acid soluble Al (aluminum) is an element to form (Al, Si)N which acts as the inhibitor by bonding to N. When the amount of acid soluble Al is less than 0.010%, the effect of addition is not sufficiently obtained, and the secondary recrystallization does not proceed sufficiently. Thus, the amount of acid soluble Al is to be 0.010% or more. The amount of acid soluble Al is preferably 0.015% or more, and more preferably 0.020% or more.

On the other hand, when the amount of acid soluble Al is more than 0.065%, the dispersion state of precipitation of AlN and/or (Al, Si)N becomes uneven, the desired secondary recrystallized structure cannot be obtained, and the magnetic flux density decreases. Thus, the amount of acid soluble Al (Sol. Al) is to be 0.065% or less. The amount of acid soluble Al is preferably 0.055% or less, and more preferably 0.050% or less.

(0.004 to 0.012% of N)

N (nitrogen) is an element to form AlN and/or (Al, Si)N which act as the inhibitor by bonding to Al. When the N content is less than 0.004%, the formation of AlN and/or (Al, Si)N becomes insufficient. Thus, the N content is to be 0.004% or more. The N content is preferably 0.006% or more, and more preferably 0.007% or more.

On the other hand, when the N content is more than 0.012%, the blisters (voids) may be formed in the steel sheet. Thus, the N content is to be 0.012% or less.

The steel piece includes, as the chemical composition, the above elements, and the balance consists of Fe and impurities. However, in consideration of the influence on the magnetic characteristics and the improvement of the inhibitors functions by forming compounds, the steel piece may include at least one of optional elements as substitution for a part of Fe. For instance, the optional elements included as substitution for a part of Fe may be Cr, Cu, P, Sn, Sb, Ni, B, V, Nb, Mo, Ti, and Bi. However, the optional elements do not need to be included, the lower limits thereof may be 0% respectively. Moreover, even if the optional elements may be included as impurities, the above mentioned effects are not affected. Herein, the impurities correspond to elements which are contaminated during industrial production of steel from ores and scrap that are used as a raw material of steel, or from environment of a production process.

(0 to 0.30% of Cr)

Cr (chrome) is an element effective in increasing the electric resistance, and thereby, reducing the iron loss, in common with Si. Thus, Cr may be included. In order to obtain the above effects, the Cr content is preferably 0.02% or more, and more preferably 0.05% or more.

On the other hand, when the Cr content is more than 0.30%, the magnetic flux density may deteriorate. Thus, the upper limit of the Cr content is preferably 0.30%, more preferably 0.20%, and further more preferably 0.12%.

(0 to 0.40% of Cu)

Cu (copper) is also an element effective in increasing the electric resistance, and thereby, reducing the iron loss. Thus, Cu may be included. In order to obtain the above effects, the Cu content is preferably 0.05% or more, and more preferably 0.10% or more.

On the other hand, when the Cu content is more than 0.40%, the improvement effect of reducing the iron loss may be saturated, and surface defects called "copper scab" may be incurred during hot rolling. Thus, the upper limit of the Cu content is preferably 0.40%, more preferably 0.30%, and further more preferably 0.20%.

(0 to 0.50% of P)

P (phosphorus) is also an element effective in increasing the electric resistance, and thereby, reducing the iron loss. Thus, P may be included. In order to obtain the above effects, the P content is preferably 0.005% or more, and more preferably 0.010% or more.

On the other hand, when the P content is more than 0.50%, the rollability may deteriorate. Thus, the upper limit of the P content is preferably 0.50%, more preferably 0.20%, and further more preferably 0.15%.

(0 to 0.30% of Sn)
(0 to 0.30% of Sb)

Sn (tin) and Sb (antimony) are elements effective in stabilizing the secondary recrystallization, and thereby, developing the {110}<001> orientation. Thus, Sn and Sb may be included. In order to obtain the above effects, the Sn content is preferably 0.02% or more, and more preferably 0.05% or more. Moreover, the Sb content is preferably 0.01% or more, and more preferably 0.03% or more.

On the other hand, when the Sn content is more than 0.30% or when the Sb content is more than 0.30%, the magnetic characteristics may deteriorate. Thus, the upper limits of the Sn content and the Sb content are preferably 0.30% respectively. The upper limit of the Sn content is preferably 0.15%, and more preferably 0.10%. Moreover, the upper limit of the Sb content is preferably 0.15%, and more preferably 0.10%.

(0 to 1.00% of Ni)

Ni (nickel) is also an element effective in increasing the electric resistance, and thereby, reducing the iron loss. Moreover, Ni is an element effective in controlling the metallographic structure of the hot rolled steel sheet, and thereby, improving the magnetic characteristics. Thus, Ni may be included. In order to obtain the above effects, the Ni content is preferably 0.01% or more, and more preferably 0.02% or more.

On the other hand, when the Ni content is more than 1.00%, the secondary recrystallization may be unstable. Thus, the Ni content is preferably 1.00% or less, more preferably 0.20% or less, and further more preferably 0.10% or less.

(0 to 0.008% of B)

B (boron) is an element effective in forming BN which acts as the inhibitor by bonding to N. Thus, B may be included. In order to obtain the above effects, the B content is preferably 0.0005% or more, and more preferably 0.0010% or more.

On the other hand, when the B content is more than 0.008%, the magnetic characteristics may deteriorate. Thus, the upper limit of the B content is preferably 0.008%, more preferably 0.005%, and further more preferably 0.003%.

(0 to 0.15% of V)
(0 to 0.20% of Nb)
(0 to 0.015% of Ti)

V (vanadium), Nb (niobium), and Ti (titanium) are elements which act as the inhibitor by bonding to N, C, and the like. Thus, V, Nb, and Ti may be included. In order to obtain the above effects, the V content is preferably 0.002% or more, and more preferably 0.010% or more. The Nb content is preferably 0.005% or more, and more preferably 0.020% or more. The Ti content is preferably 0.002% or more, and more preferably 0.004% or more.

On the other hand, when the V content is more than 0.15%, when the Nb content is more than 0.20%, or when the Ti content is more than 0.015% in the steel piece, there elements may remain in the final product. In the case, as the final product, the V content may be more than 0.15%, the Nb content may be more than 0.20%, or the Ti content may be more than 0.015%. As a result, the magnetic characteristics of the final product (grain oriented electrical steel sheet) may deteriorate.

Thus, the upper limit of the V content is preferably 0.15%, more preferably 0.10%, and further more preferably 0.05%. The upper limit of the Ti content is preferably 0.015%, more preferably 0.010%, and further more preferably 0.008%. Thus, the upper limit of the Nb content is preferably 0.20%, more preferably 0.10%, and further more preferably 0.08%.

(0 to 0.10% of Mo)

Mo (molybdenum) is also an element effective in increasing the electric resistance, and thereby, reducing the iron loss. Thus, Mo may be included. In order to obtain the above effects, the Mo content is preferably 0.005% or more, and more preferably 0.01% or more.

On the other hand, when the Mo content is more than 0.10%, the rollability of the steel sheet may deteriorate. Thus, the upper limit of the Mo content is preferably 0.10%, more preferably 0.08%, and further more preferably 0.05%.

(0 to 0.010% of Bi)

Bi (bismuth) is an element effective in stabilizing precipitates such as sulfide, and thereby, improving the inhibitors functions. Thus, Bi may be included. In order to obtain the above effects, the Bi content is preferably 0.001% or more, and more preferably 0.002% or more.

On the other hand, when the Bi content is more than 0.010%, the magnetic characteristics may deteriorate. Thus, the upper limit of the Bi content is preferably 0.010%, more preferably 0.008%, and further more preferably 0.006%.

The chemical composition as described above may be measured by typical analytical methods for the steel. For instance, the chemical composition may be measured by using ICP-AES (Inductively Coupled Plasma-Atomic Emission Spectrometer: inductively coupled plasma emission spectroscopy spectrometry). Herein, the acid soluble Al may be measured by ICP-AES using filtrate after heating and dissolving the sample in acid. In addition, C and S may be measured by the infrared absorption method after combustion, N may be measured by the thermal conductometric method after fusion in a current of inert gas, and O may be measured by, for instance, the non-dispersive infrared absorption method after fusion in a current of inert gas.

Next, conditions for hot-rolling the above steel piece are explained.

The conditions of the hot rolling are not particularly limited. For instance, the conditions are as follows.

The slab is heated before the hot rolling. The slab is put and heated in a known heating furnace or a known soaking furnace. As one method, the slab is heated to 1280° C. or less. By setting the heating temperature of the slab to 1280° C. or less, for instance, it is possible to avoid various problems when the heating temperature is more than 1280° C. (a dedicated high temperature heating furnace is required, the melt scale amount rapidly increases, and the like). The lower limit of the heating temperature of the slab is not particularly limited. However, when the heating temperature is excessively low, the hot rolling may become difficult and the productivity may be decreased. Thus, the heating temperature may be in the range of 1280° C. or less in consideration of the productivity. The lower limit of the heating temperature of the slab is preferably 1100° C. The upper limit of the heating temperature of the slab is preferably 1250° C.

In addition, as another method, the slab is heated to higher temperature of 1320° C. or more. By heating the slab to higher temperature of 1320° C. or more, it is possible to stabilize the secondary recrystallization by solutionizing AlN and Mn(S, Se) and by finely precipitating them in the subsequent processes.

The slab heating in itself may be omitted, and the hot rolling may be conducted after casting and before decreasing the temperature of the slab.

The heated slab is hot-rolled by a hot rolling mill, and thereby, the hot rolled steel sheet is obtained. The hot rolling mill includes, for instance, a rough rolling mill and a final rolling mill which is arranged downstream of the rough rolling mill. The rough rolling mill includes rough rolling stands which are in a row. Each of the rough rolling stands has plural rolls arranged one above the other. In the same way, the final rolling mill includes final rolling stands which are in a row. Each of the final rolling stands has plural rolls arranged one above the other. The heated steel piece is rolled by the rough rolling mill and then by the final rolling mill, and thereby, the hot rolled steel sheet is obtained.

A final temperature in the hot rolling process (the temperature of the steel sheet at outlet side of the final rolling stand by which the steel sheet is finally rolled in the final rolling mill) may be 700 to 1150° C. The hot rolled steel sheet is produced by the hot rolling process explained above.

<Hot Band Annealing Process>

In the hot band annealing process, as necessary, the hot rolled steel sheet obtained by the hot rolling process is annealed (hot band annealed) to obtain the hot band annealed sheet. In the embodiment, the steel sheet after the hot band annealing process is referred to as the hot band annealed sheet.

The hot band annealing is conducted in order to homogenize the nonuniform structure after hot rolling, to control the precipitation of AlN which is the inhibitor (precipitate finely), and to control secondary phase, solid-soluted carbon, and the like. As the annealing conditions, known conditions may be applied according to the purpose. For instance, in order to homogenize the nonuniform structure after hot rolling, the hot rolled steel sheet is hold at 750 to 1200° C. of the heating temperature (furnace temperature in a hot band annealing furnace) for 30 to 600 seconds.

The hot band annealing is not always necessary. The hot band annealing may be conducted as a result of considering the characteristics and the producing cost required for the grain oriented electrical steel sheet finally produced.

<Hot Band Pickling Process>

In the hot band pickling process, as necessary, the hot rolled steel sheet after the hot rolling process or the hot band annealed sheet after the hot band annealing process in a case where the hot band annealing has been conducted is pickled in order to remove surface scale. The pickling conditions are not particularly limited, and known conditions may be appropriately applied.

<Cold Rolling Process>

In the cold rolling process, the hot rolled steel sheet or the hot band annealed sheet after the hot rolling process, the hot band annealing process, or the hot band pickling process is cold-rolled by once or by plural times with an intermediate annealing to obtain the cold rolled steel sheet. In the embodiment, the steel sheet after the cold rolling process is referred to as the cold rolled steel sheet.

A cold rolling reduction rate in final cold rolling (cumulative cold rolling reduction rate without intermediate annealing or cumulative cold rolling reduction rate after intermediate annealing) is preferably 80% or more, and more preferably 90% or more. The upper limit of the final cold rolling reduction rate is preferably 95%.

Herein, the final cold rolling reduction rate (%) is defined as follows.

Final cold rolling reduction rate (%)=(1−Sheet thickness of steel sheet after final cold rolling/Sheet thickness of steel sheet before final cold rolling)×100

<Decarburization Annealing Process>

In the decarburization annealing process, the cold rolled steel sheet after the cold rolling process is subjected to the magnetic domain refining treatment as necessary, and then, is decarburization-annealed to promote the primary recrystallization. Moreover, in the decarburization annealing, C which negatively affective in the magnetic characteristics is removed from the steel sheet. In the embodiment, the steel sheet after the decarburization annealing process is referred to as the decarburization annealed sheet.

For the above purposes, in the decarburization annealing, the oxidation degree ($PH_2O/PH_2$) in atmosphere is to be 0.18 to 0.80, an annealing temperature is to be 750 to 900° C., and a holding is to be 10 to 600 seconds. The oxidation degree $PH_2O/PH_2$ is defined as the ratio of water vapor partial pressure $PH_2O$ (atm) to hydrogen partial pressure $PH_2$ (atm) in the atmosphere.

When the oxidation degree ($PH_2O/PH_2$) is less than 0.18, dense silicon dioxide ($SiO_2$) is quickly formed as an externally oxidized layer, it is suppressed to release C outside the system, and thus, the decarburization does not occur properly. On the other hand, when the oxidation degree is more than 0.80, the oxidized layer of the steel sheet surface is thickened, and it is difficult to remove the oxidized layer.

When the annealing temperature is less than 750° C., it is difficult to sufficiently conduct the decarburization. On the other hand, when the annealing temperature is more than 900° C., the grain size after the primary recrystallization exceeds favorable size, and thereby, the magnetic characteristics after the final annealing deteriorate.

When the holding time is less than 10 seconds, the decarburization does not occur sufficiently. On the other hand, when the holding time is more than 600 seconds, the grain size after the primary recrystallization exceeds favorable size, and thereby, the magnetic characteristics after the final annealing deteriorate.

Depending on the above oxidation degree ($PH_2O/PH_2$), a heating rate in a heating stage to the annealing temperature may be controlled. For instance, in a case where the heating including an induction heating is conducted, an average heating rate may be 5 to 1000° C./second. Moreover, in a case where the heating including an electric heating is conducted, an average heating rate may be 5 to 3000° C./second.

In addition, in the decarburization annealing process, the nitriding treatment may be conducted. In the nitriding treatment, the cold rolled steel sheet may be annealed in the atmosphere including ammonia in at least one stage before, during, or after the above holding. In a case where the temperature for heating the slab is lower, it is preferable that the nitriding treatment is conducted in the decarburization annealing process. By additionally conducting the nitriding treatment in the decarburization annealing process, the inhibitor such as AlN and (Al, Si)N is formed, and thus, it is possible to make the secondary recrystallization occur stably.

Although the conditions for the nitriding treatment are not particularly limited, it is preferable to conduct the nitriding treatment so that the nitrogen content increases by 0.003% or more, preferably 0.005% or more, and more preferably 0.007% or more. When the nitrogen (N) content is more than 0.030%, the effects are saturated. Thus, the nitriding treatment may be conducted so that the nitrogen content becomes 0.030% or less.

The conditions for the nitriding treatment are not particularly limited, and known conditions may be appropriately applied.

For instance, in a case where the nitriding treatment is conducted after the holding at 750 to 900° C. for 10 to 600 seconds in the oxidation degree ($PH_2O/PH_2$) of 0.01 to 0.15, the nitriding treatment may be conducted such that the cold rolled steel sheet is not cooled to the room temperature but held in the cooling stage in the atmosphere including the ammonia. It is preferable that the oxidation degree ($PH_2O/PH_2$) in the cooling stage is within the range of 0.0001 to 0.01. Moreover, in a case where the nitriding treatment is conducted during the holding at 750 to 900° C. for 10 to 600 seconds in the oxidation degree ($PH_2O/PH_2$) of 0.01 to 0.15, the ammonia may be included in the atmospheric gas with the above oxidation degree.

<Annealing Separator Applying Process>

In the annealing separator applying process, the decarburization annealed sheet after the decarburization annealing process (or the decarburization annealed sheet after the nitriding treatment) is subjected to the magnetic domain refining treatment as necessary, and then, the annealing separator including $Al_2O_3$ and MgO is applied to the decarburization annealed sheet. Thereafter, the applied annealing separator is dried.

In a case where the annealing separator includes MgO but does not include $Al_2O_3$, the forsterite film is formed on the steel sheet in the final annealing process. On the other hand, in a case where the annealing separator includes $Al_2O_3$ but does not include MgO, mullite ($3Al_2O_3.2SiO_2$) is formed on the steel sheet. The mullite becomes the obstacle of movement of the magnetic domain wall, and thus, causes the deterioration of the magnetic characteristics of the grain oriented electrical steel sheet.

Thus, in the method for producing the grain oriented electrical steel sheet according to the embodiment, as the annealing separator, the annealing separator including $Al_2O_3$ and MgO is utilized. By utilizing the annealing separator including $Al_2O_3$ and MgO, the forsterite film is not formed on the surface of the steel sheet, and it is possible to smoothen the surface of the steel sheet after the final annealing.

For the annealing separator, $MgO/(MgO+Al_2O_3)$ which is the mass ratio of MgO and $Al_2O_3$ is to be 5 to 50%, and the hydration water is to be 1.5 mass % or less.

When $MgO/(MgO+Al_2O_3)$ is less than 5%, the mullite is excessively formed, and thus, the iron loss deteriorates. On the other hand, when $MgO/(MgO+Al_2O_3)$ is more than 50%, the forsterite is formed, and thus, the iron loss deteriorates. When the hydration water in the annealing separator is more than 1.5 mass %, the secondary recrystallization may be unstable, and it may be difficult to smoothen the surface of the steel sheet because the surface of the steel sheet is oxidized ($SiO_2$ is formed) in the final annealing. The lower limit of the hydration water is not particularly limited, but may be 0.1 mass % for instance.

The annealing separator is applied by water slurry or by electrostatic spray. In the annealing separator applying process, the annealing separator may further include nitrides such as manganese nitride, iron nitride, and chromium nitride which are decomposed before the secondary recrystallization in the final annealing process and which nitride the decarburization annealed sheet or the decarburized and nitrided sheet.

<Final Annealing Process>

The decarburization annealed sheet after applying the above annealing separator is final-annealed to obtain the final annealed sheet. By conducting the final annealing for the decarburization annealed sheet after applying the above annealing separator, the secondary recrystallization proceeds, and the crystal orientation aligns in the {110}<001> orientation. In the embodiment, the steel sheet after the final annealing process is referred to as the final annealed sheet.

Specifically, in the final annealing process, the decarburization annealed sheet after applying the annealing separator is held at 1100 to 1200° C. for 10 hours or more in the mixed gas atmosphere including 50 volume % or more of a hydrogen. The upper limit of the annealing time is not particularly limited, but may be 30 hours for instance. By conducting the above final annealing, the secondary recrystallization proceeds, and the crystal orientation aligns in the {110}<001> orientation.

<Annealing Separator Removing Process>

In the annealing separator removing process, the redundant annealing separator is removed from the surface of the steel sheet after the final annealing (the final annealed sheet) by methods including water-washing and pickling. Here, the redundant annealing separator indicates, for instance, the unreacted annealing separator which has not reacted with the steel sheet during the final annealing.

Specifically, in order to prevent the iron after water-washing from corroding, the final annealed sheet is water-washed using the solution including the inhibitor (corrosion prevention agent) which is at least one of triethanolamine, rosinamine, or mercaptan.

After water-washing the final annealed sheet, the pickling may be conducted using the acidic solution whose volume concentration is less than 20%. For instance, the final annealed sheet is pickled using the solution including less than 20 volume % in total of at least one of sulfuric acid, nitric acid, hydrochloric acid, phosphoric acid, chloric acid, chromium oxide in aqueous solution, chromate acid mixture, permanganic acid, peroxosulfuric acid, and peroxophosphoric acid. The lower limit of the volume concentration is not particularly limited, but may be 0.1 volume % for instance. Herein, the above volume % may be the concentration based on the volume at room temperature.

By conducting the above water-washing and pickling using the above solution, it is possible to efficiently remove the redundant annealing separator from the surface of the final annealed sheet.

Moreover, the temperature of the solution is preferably 20 to 80° C. By controlling the temperature of the solution to be within the above range, it is possible to efficiently remove the redundant annealing separator from the surface of the steel sheet.

By water-washing and pickling explained above, the total amount of iron hydroxide and iron oxide on the surface of the final annealed sheet is controlled to 0.9 $g/m^2$ or less per a side.

When the removal of the redundant annealing separator on the steel sheet surface is insufficient and when the total amount of the iron hydroxide and the iron oxide on the steel sheet surface is more than 0.9 $g/m^2$ per a side, the exposure of the base steel sheet surface may be insufficient, and thus, the steel sheet surface may not be sufficiently smoothed. The lower limit of the amount of the iron hydroxide and the iron oxide is not particularly limited, but may be 0.01 $g/m^2$ for instance.

In order to remove the redundant annealing separator, a scrubber may be utilized in addition to the above water-washing and pickling By utilizing the scrubber, it is possible to reliably remove the redundant annealing separator which deteriorates the wettability in the insulation coating forming process.

<Smoothing Process>

The base steel sheet is exposed by conducting the above water-washing and pickling, and thereafter, the annealing is conducted at 1000° C. or more in the mixed gas atmosphere including 50 volume % or more of hydrogen or carbon monoxide, in order to obtain the final annealed sheet whose surface (base steel sheet surface) is smoothed. Hereinafter, the annealing for smoothing is referred to as the smoothing annealing.

In the smoothing annealing, by heating the steel sheet whose surface is exposed in the mixed gas atmosphere including reducing gas, atom evaporates and moves from the base steel sheet surface, and the smooth surface which does not tend to interfere with magnetization is revealed. The gas to be mixed with the reducing gas is preferably inert gas such as nitrogen gas or argon gas. Although using the mixed gas of the hydrogen and the nitrogen is industrially the lowest cost, the carbon monoxide may be substituted for the hydrogen.

When the hydrogen or the carbon monoxide included in the mixed gas atmosphere for the smoothing annealing is less than 50 volume %, the base steel sheet surface is oxidized, metallic luster decreases, and thus, the magnetic characteristics of the final product deteriorate. When the volume fraction of the hydrogen or the carbon monoxide increases, the effect in smoothing the base steel sheet surface increases. When the mixed gas atmosphere includes 50 volume % or more of the hydrogen or the carbon monoxide, the above effect is obtained. Thus, the lower limit of the volume fraction of the hydrogen or the carbon monoxide is to be 50%. The upper limit of the volume fraction of the hydrogen or the carbon monoxide is not particularly limited, but may be 100% for instance.

When the annealing temperature for the smoothing annealing is higher, the smoothing effect is obtained in a shorter time. When the annealing temperature is 1000° C. or more, it is possible to effectively promote that the atom evaporates and moves from the base steel sheet surface. On the other hand, when the annealing temperature for the smoothing annealing is less than 1000° C., the smoothing effect is insufficient, and the magnetic characteristics deteriorate. Thus, the lower limit of the annealing temperature for the smoothing annealing is to be 1000° C. The upper limit of the annealing temperature for the smoothing annealing is not particularly limited. However, when the annealing temperature is more than 1200° C., the smoothing effect is saturated. Thus, it is preferable that the annealing temperature is controlled to 1200° C. or less.

When the surface of the final annealed sheet is not smooth, the unevenness of the surface becomes the obstacle of movement of the magnetic domain wall, and thus, the iron loss deteriorates. However, by conducting the above smoothing annealing after sufficiently exposing the surface of the final annealed sheet, it is possible to obtain the surface state such that the flatness is extremely high. Thus, in the case, the movement of the magnetic domain wall becomes smooth, and thus, it is possible to sufficiently obtain the effect of improving the iron loss.

<Insulation Coating Forming Process>

In the insulation coating forming process, the final annealed sheet after being smoothed is subjected to the magnetic domain refining treatment as necessary, and then, the insulation coating is formed on the surface of the final annealed sheet. In the embodiment, the steel sheet after the insulation coating forming process is referred to as the grain oriented electrical steel sheet.

The coating applies the tension to the grain oriented electrical steel sheet, and thereby, reduces the iron loss as the single steel sheet. Moreover, the coating ensures interlaminar electrical insulation when the grain oriented electrical steel sheets are utilized after being laminated, and thereby, reduces the iron loss as an iron core.

The insulation coating is formed on the surface of the final annealed sheet by applying the insulation coating forming solution which mainly includes at least one of the phosphate or the colloidal silica, by baking at 350 to 600° C., and then by heat-treating at 800 to 1000° C.

The above phosphate is favorably the phosphate of Ca, Al, Sr, and the like. Among these, the aluminum phosphate is more preferable. The above colloidal silica is not particularly limited to the colloidal silica having specific properties. Moreover, the particle size thereof is not particularly limited to specific particle size, but is preferably 200 nm or less (mean number diameter). For instance, the particle size may be 5 to 30 nm. When the particle size thereof is more than 200 nm, the particles may settle in the solution. Moreover, the solution may further include the chromic anhydride or the chromate.

When the baking temperature for the insulation coating is less than 350° C., the solution for the insulation coating drips during passing the steel sheet, poor appearance is caused, and the insulation coating with sufficient adhesion is not obtained. When the baking temperature for the insulation coating is more than 600° C., since the heating rate is excessively fast, only the outermost surface of the insulation coating is solidified, and the solidification of the inside is delayed, the formation of the coating becomes improper and the coating adhesion becomes insufficient. When the temperature of the heat treatment after baking is less than 800° C., the formation of the coating becomes improper (insufficient solidification), and the coating adhesion becomes insufficient. When the temperature of the heat treatment after baking is more than 1000° C., the phosphate is decomposed, the formation of the coating becomes improper, and coating adhesion becomes insufficient.

In the insulation coating forming, when the oxidation degree ($PH_2O/PH_2$) of the atmosphere is 0.01 to 1.5, the phosphate is not excessively decomposed, and it is possible to favorably form the insulation coating.

The insulation coating forming solution may be applied to the surface of the steel sheet, for instance, by the wet applying method such as roll coater.

<Magnetic Domain Refining Process>

The method for producing the grain oriented electrical steel sheet according to the embodiment may include the magnetic domain refining process of conducting the magnetic domain refining treatment at appropriate timing of (first) between the cold rolling process and the decarburization annealing process, (second) between the decarburization annealing process and the annealing separator applying process, (third) between the smoothing process and the insulation coating forming process, or (fourth) after the insulation coating forming process.

By conducting the magnetic domain refining treatment, it is possible to reduce the iron loss of the grain oriented electrical steel sheet. In a case where the magnetic domain refining treatment is conducted between the cold rolling process and the decarburization annealing process, between the decarburization annealing process and the annealing separator applying process, or between the smoothing process and the insulation coating forming process, the groove may be formed lineally or punctiformly so as to extend in the direction intersecting the rolling direction and so as to have the predetermined interval in the rolling direction. By forming the above groove, the width of 180° domain may be narrowed (180° domain may be refined).

In a case where the magnetic domain refining treatment is conducted after the insulation coating forming process, the stress-strain or the groove may be applied or formed lineally or punctiformly so as to extend in the direction intersecting the rolling direction and so as to have the predetermined interval in the rolling direction. By applying the above stress-strain or forming the above groove, the width of 180° domain may be narrowed (180° domain may be refined).

The above stress-strain may be applied by irradiating laser beam, electron beam, and the like. The above groove may be formed by a mechanical groove forming method such as toothed gear, by a chemical groove forming method such as electrolytic etching, by a thermal groove forming method such as laser irradiation, and the like. In a case where the insulation coating is damaged and the performance such as electrical insulation deteriorates by applying the above stress-strain or forming the above groove, the insulation coating may be formed again, and thereby, the damage may be repaired.

FIG. 1 shows an instance of the method for producing the grain oriented electrical steel sheet according to the embodiment. In the FIGURE, the processed surrounded by the solid line indicates the essential processed, and the processed surrounded by the broken line indicates the optional processes.

The grain oriented electrical steel sheet produced by the method according to the embodiment does not include the forsterite film. Specifically, the grain oriented electrical steel sheet includes a base steel sheet, an intermediate layer which is arranged in contact with the base steel sheet, and the insulation coating which is arranged in contact with the intermediate layer to be an outermost surface.

Whether or not the grain oriented electrical steel sheet includes the forsterite film may be confirmed by X-ray diffraction method. For instance, the X-ray diffraction may be conducted for the surface after removing the insulation coating from the grain oriented electrical steel sheet, and the obtained X-ray diffraction spectrum may be collated with PDF (Powder Diffraction File). The forsterite ($Mg_2SiO_4$) may be identified by JCPDS No. 34-189. In the embodiment, when the primal constituent phase in the above X-ray diffraction spectrum is not the forsterite, the grain oriented electrical steel sheet is judged not to include the forsterite film.

In order to only remove the insulation coating from the grain oriented electrical steel sheet, the grain oriented electrical steel sheet with the coating may be immersed in hot alkaline solution. Specifically, it is possible to remove the insulation coating from the grain oriented electrical steel sheet by immersing the steel sheet in sodium hydroxide aqueous solution which includes 30 mass % of NaOH and 70 mass % of $H_2O$ at 80° C. for 20 minutes, washing it with water, and then, drying it. In general, only insulation coating is removed by the alkaline solution, and the forsterite film is removed by the acidic solution such as hydrochloric acid.

In the grain oriented electrical steel sheet produced by the method according to the embodiment, since the forsterite film is not included, the magnetic characteristics (the iron loss characteristics) are improved. In addition, since each of the processes is optimally controlled, the coating adhesion is improved.

EXAMPLES

Hereinafter, the examples of the present invention are explained. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

In steel slabs having the chemical composition shown in Table 1, the steel slabs of No. A13 and No. a11 were heated to 1350° C., and then hot-rolled to obtain the hot rolled steel sheets having the sheet thickness of 2.6 mm. The hot rolled steel sheets were cold-rolled once or cold-rolled plural times with the intermediate annealing to obtain the cold rolled steel sheets having the final sheet thickness of 0.22 mm. The cold rolled steel sheets having the final sheet thickness of 0.22 mm were decarburization-annealed in the decarburization annealing process under conditions shown in Tables 2 to 4.

Moreover, in the steel slabs having the chemical composition shown in Table 1, the steel slabs except for No. A13 and No. a11 were heated to 1150° C., and then hot-rolled to obtain the hot rolled steel sheets having the sheet thickness of 2.6 mm. The hot rolled steel sheets were cold-rolled once or cold-rolled plural times with the intermediate annealing to obtain the cold rolled steel sheets having the final sheet thickness of 0.22 mm. The cold rolled steel sheets having the final sheet thickness of 0.22 mm were decarburization-annealed in the decarburization annealing process under conditions shown in Tables 2 to 4, and thereafter, the nitriding treatment was conducted during cooling by being held in the atmosphere including the ammonia.

In No. B5, the hot rolled steel sheet after the hot rolling was subjected to the hot band annealing in which the annealing was conducted at 1100° C. and then at 900° C. Thereafter, the pickling was conducted in order to remove the surface scale, and then, the cold rolling was conducted.

In the decarburization annealing, the average heating rate in the heating stage to the annealing temperature was less than 15° C./second.

For the decarburization annealed sheets after the above decarburization annealing, the annealing separator was applied and dried. The conditions of the ratio of MgO and $Al_2O_3$ ($MgO/(MgO+Al_2O_3)$) and the hydration water are shown in Tables 2 to 4.

The decarburization annealed sheets after applying the annealing separator were final-annealed at 1100° C. or 1200° C. The conditions of the final annealing are shown in Tables 5 to 7.

After the final annealing, as shown in Tables 5 to 7, the redundant annealing separator was removed by water-washing and pickling from the surface of the final annealed sheet. For the water-washing, the solution including the inhibitor which was at least one of triethanolamine, rosinamine, or mercaptan was used. For the pickling, the sulfuric acid aqueous solution (volume concentration of sulfuric acid: 1 volume %) was used. Herein, the comparative examples No. b15 to b17, the pickling was not conducted.

After removing the redundant annealing separator from the final annealed sheet, the smoothing annealing for the final annealed sheet was conducted in the mixed gas atmosphere at the baking temperature shown in Tables 8 to 10. By the smoothing annealing, the surface of the final annealed sheet was smoothed.

Thereafter, the insulation coating forming solution which mainly included the phosphate or the colloidal silica and which included the chromic anhydride as necessary was applied. In order to form the insulation coating, the above solution was baked at the baking temperature shown in Tables 8 to 10, and then, was heat-treated at the temperature shown in Tables 8 to 10.

Moreover, in the examples, as shown in Tables 11 to 13, the magnetic domain refining treatment was conducted at any timing of (first) between the cold rolling process and the decarburization annealing process, (second) between the decarburization annealing process and the annealing separator applying process, (third) between the smoothing process and the insulation coating forming process, or (fourth) after the insulation coating forming process. For the magnetic domain refinement, the groove was formed mechanically or chemically, or the stress-strain or the groove was applied or formed by the laser.

For the obtained grain oriented electrical steel sheets Nos. B1 to B46 and b1 to b33, the iron loss and the coating adhesion were evaluated.

<Iron Loss>

The samples were taken from the obtained grain oriented electrical steel sheets, and the iron loss W17/50 (W/kg) was measured under the conditions of 50 Hz of AC frequency and 1.7 T of excited magnetic flux density on the basis of the epstein test regulated by JIS C2550-1: 2000. As for the grain oriented electrical steel sheets in which the magnetic domain refinement was conducted, when the iron loss W17/50 was less than 0.7 W/kg, it was judged to as acceptable. As for the grain oriented electrical steel sheets in which the magnetic domain refinement was not conducted, when the iron loss W17/50 was less than 1.0 W/kg, it was judged to as acceptable.

<Coating Adhesion>

The samples were taken from the obtained grain oriented electrical steel sheets, and the coating adhesion of the insulation coating was evaluated by rolling the sample around the cylinder with 20 mm of diameter (180° bending) and by measuring the area fraction of remained coating after bending back. In the evaluation of the coating adhesion of the insulation coating, the presence or absence of delamination of the insulation coating was visually evaluated. When the area fraction of remained coating which was not delaminated from the steel sheet was 90% or more, it was regarded as ⊚ (Very Good). When the area fraction was 85% or more and less than 90%, it was regarded as ○ (Good). When the area fraction was 80% or more and less than 85%, it was regarded as Δ (Poor). When the area fraction was less than 80%, it was regarded as × (NG). When the area fraction of remained coating was 85% or more (the above ⊚ and ○), it was judged to as acceptable.

The results are shown in Tables 11 to 13.

TABLE 1

| STEEL | CHEMICAL COMPOSITION (mass %) (BALANCE CONSISTING OF Fe AND IMPURITIES) | | | | | | | | |
|---|---|---|---|---|---|---|---|---|---|
| No. | C | Si | Mn | S | Se | S + Se | Al | N | OTHER ELEMENTS |
| A1 | 0.030 | 3.45 | 0.10 | 0.006 | | 0.006 | 0.022 | 0.008 | |
| A2 | 0.100 | 3.45 | 0.10 | 0.006 | | 0.006 | 0.022 | 0.008 | |
| A3 | 0.060 | 0.80 | 0.10 | 0.006 | | 0.006 | 0.022 | 0.008 | |
| A4 | 0.060 | 7.00 | 0.10 | 0.006 | | 0.006 | 0.022 | 0.008 | |
| A5 | 0.060 | 3.45 | 0.01 | 0.006 | | 0.006 | 0.022 | 0.008 | Cu: 0.15, Ti: 0.006 |
| A6 | 0.060 | 3.45 | 1.00 | 0.006 | 0.020 | 0.026 | 0.022 | 0.008 | B: 0.002, Cr: 0.08, V: 0.03 |
| A7 | 0.060 | 3.45 | 0.10 | 0.004 | 0.002 | 0.006 | 0.022 | 0.008 | P: 0.10, Nb: 0.05 |
| A8 | 0.060 | 3.45 | 0.10 | 0.050 | 0.010 | 0.060 | 0.022 | 0.008 | Sn: 0.08, Sb: 0.05, Ni: 0.05 |
| A9 | 0.060 | 3.45 | 0.10 | 0.006 | | 0.006 | 0.010 | 0.008 | |
| A10 | 0.060 | 3.45 | 0.10 | 0.006 | | 0.006 | 0.065 | 0.004 | |
| A11 | 0.060 | 3.45 | 0.10 | 0.006 | | 0.006 | 0.022 | 0.012 | |
| A12 | 0.060 | 3.45 | 0.10 | 0.006 | | 0.006 | 0.022 | 0.008 | |
| A13 | 0.080 | 3.25 | 0.08 | 0.025 | 0.001 | 0.026 | 0.022 | 0.007 | Bi: 0.004, Mo: 0.03 |
| a1 | 0.010 | 3.45 | 0.10 | 0.006 | | 0.006 | 0.022 | 0.008 | |
| a2 | 0.400 | 3.45 | 0.10 | 0.006 | | 0.006 | 0.022 | 0.008 | |
| a3 | 0.060 | 0.50 | 0.10 | 0.006 | | 0.006 | 0.022 | 0.008 | |
| a4 | 0.060 | 9.00 | 0.10 | 0.006 | | 0.006 | 0.022 | 0.008 | |
| a5 | 0.060 | 3.45 | 0.004 | 0.006 | | 0.006 | 0.022 | 0.008 | Cu: 0.15, Ti: 0.006 |
| a6 | 0.060 | 3.45 | 1.50 | 0.006 | | 0.006 | 0.022 | 0.008 | B: 0.002, Cr: 0.08, V: 0.03 |
| a7 | 0.060 | 3.45 | 0.10 | 0.070 | | 0.070 | 0.022 | 0.008 | P: 0.10, Nb: 0.05 |
| a8 | 0.060 | 3.45 | 0.10 | 0.080 | 0.010 | 0.090 | 0.022 | 0.008 | Sn: 0.08, Sb: 0.05, Ni: 0.05 |
| a9 | 0.060 | 3.45 | 0.10 | 0.006 | | 0.006 | 0.005 | 0.008 | |
| a10 | 0.060 | 3.45 | 0.10 | 0.006 | | 0.006 | 0.080 | 0.001 | |
| a11 | 0.060 | 3.25 | 0.08 | 0.025 | 0.001 | 0.026 | 0.022 | 0.025 | Bi: 0.004, Mo: 0.03 |

TABLE 2

| | | | DECARBURIZATION ANNEALING PROCESS | | | ANNEALING SEPARATOR APPLYING PROCESS | |
|---|---|---|---|---|---|---|---|
| | No. | STEEL No. | OXIDATION DEGREE (—) | ANNEALING TEMPERATURE (° C.) | HOLDING TIME (sec) | MgO/ (MgO + Al$_2$O$_3$) (mass %) | HYDRATION WATER (mass %) |
| INVENTIVE EXAMPLE | B1 | A12 | 0.18 | 840 | 60 | 30 | 1.0 |
| | B2 | A12 | 0.80 | 840 | 60 | 30 | 1.0 |
| | B3 | A12 | 0.60 | 750 | 60 | 30 | 1.0 |
| | B4 | A12 | 0.60 | 900 | 60 | 30 | 1.0 |
| | B5 | A12 | 0.60 | 840 | 10 | 30 | 1.0 |
| | B6 | A12 | 0.60 | 840 | 600 | 30 | 1.0 |
| | B7 | A12 | 0.60 | 840 | 60 | 5 | 1.0 |
| | B8 | A12 | 0.60 | 840 | 60 | 50 | 1.0 |
| | B9 | A12 | 0.60 | 840 | 60 | 30 | 1.5 |
| | B10 | A12 | 0.60 | 840 | 60 | 30 | 1.0 |
| | B11 | A12 | 0.60 | 840 | 60 | 30 | 1.0 |
| | B12 | A12 | 0.60 | 840 | 60 | 30 | 1.0 |
| | B13 | A12 | 0.60 | 840 | 60 | 30 | 1.0 |
| | B14 | A12 | 0.60 | 840 | 60 | 30 | 1.0 |
| | B15 | A12 | 0.60 | 840 | 60 | 30 | 1.0 |
| | B16 | A12 | 0.60 | 840 | 60 | 30 | 1.0 |
| | B17 | A12 | 0.60 | 840 | 60 | 30 | 1.0 |
| | B18 | A12 | 0.60 | 840 | 60 | 30 | 1.0 |
| | B19 | A12 | 0.60 | 840 | 60 | 30 | 1.0 |
| | B20 | A12 | 0.60 | 840 | 60 | 30 | 1.0 |
| | B21 | A12 | 0.60 | 840 | 60 | 30 | 1.0 |
| | B22 | A12 | 0.60 | 840 | 60 | 30 | 1.0 |
| | B23 | A12 | 0.60 | 840 | 60 | 30 | 1.0 |

TABLE 2-continued

|  |  | DECARBURIZATION ANNEALING PROCESS | | | ANNEALING SEPARATOR APPLYING PROCESS | |
| --- | --- | --- | --- | --- | --- | --- |
| No. | STEEL No. | OXIDATION DEGREE (—) | ANNEALING TEMPERATURE (° C.) | HOLDING TIME (sec) | MgO/ (MgO + Al$_2$O$_3$) (mass %) | HYDRATION WATER (mass %) |
| B24 | A12 | 0.60 | 840 | 60 | 30 | 1.0 |
| B25 | A12 | 0.60 | 840 | 60 | 30 | 1.0 |
| B26 | A13 | 0.60 | 840 | 60 | 30 | 1.0 |
| B27 | A13 | 0.60 | 840 | 60 | 30 | 1.0 |

TABLE 3

|  |  |  | DECARBURIZATION ANNEALING PROCESS | | | ANNEALING SEPARATOR APPLYING PROCESS | |
| --- | --- | --- | --- | --- | --- | --- | --- |
|  | No. | STEEL No. | OXIDATION DEGREE (—) | ANNEALING TEMPERATURE (° C.) | HOLDING TIME (sec) | MgO/ (MgO + Al$_2$O$_3$) (mass %) | HYDRATION WATER (mass %) |
| INVENTIVE EXAMPLE | B28 | A13 | 0.60 | 840 | 60 | 30 | 1.0 |
|  | B29 | A12 | 0.60 | 840 | 60 | 40 | 1.0 |
|  | B30 | A12 | 0.60 | 840 | 60 | 30 | 1.0 |
|  | B31 | A12 | 0.60 | 840 | 60 | 20 | 1.0 |
|  | B32 | A13 | 0.60 | 840 | 60 | 40 | 1.0 |
|  | B33 | A13 | 0.60 | 840 | 60 | 30 | 1.0 |
|  | B34 | A13 | 0.60 | 840 | 60 | 20 | 1.0 |
|  | B35 | A1 | 0.60 | 840 | 60 | 30 | 1.0 |
|  | B36 | A2 | 0.60 | 840 | 60 | 30 | 1.0 |
|  | B37 | A3 | 0.60 | 840 | 60 | 30 | 1.0 |
|  | B38 | A4 | 0.60 | 840 | 60 | 30 | 1.0 |
|  | B39 | A5 | 0.60 | 840 | 60 | 30 | 1.0 |
|  | B40 | A6 | 0.60 | 840 | 60 | 30 | 1.0 |
|  | B41 | A7 | 0.60 | 840 | 60 | 30 | 1.0 |
|  | B42 | A8 | 0.60 | 840 | 60 | 30 | 1.0 |
|  | B43 | A9 | 0.60 | 840 | 60 | 30 | 1.0 |
|  | B44 | A10 | 0.60 | 840 | 60 | 30 | 1.0 |
|  | B45 | A11 | 0.60 | 840 | 60 | 30 | 1.0 |
|  | B46 | A12 | 0.60 | 840 | 60 | 30 | 1.0 |
| COMPARATIVE EXAMPLE | b1 | A12 | 0.05 | 840 | 60 | 30 | 1.0 |
|  | b2 | A12 | 0.98 | 840 | 60 | 30 | 1.0 |
|  | b3 | A12 | 0.60 | 600 | 60 | 30 | 1.0 |
|  | b4 | A12 | 0.60 | 1100 | 60 | 30 | 1.0 |
|  | b5 | A12 | 0.60 | 840 | 5 | 30 | 1.0 |
|  | b6 | A12 | 0.60 | 840 | 800 | 30 | 1.0 |
|  | b7 | A12 | 0.60 | 840 | 60 | 3 | 1.0 |
|  | b8 | A12 | 0.60 | 840 | 60 | 60 | 1.0 |

TABLE 4

|  |  |  | DECARBURIZATION ANNEALING PROCESS | | | ANNEALING SEPARATOR APPLYING PROCESS | |
| --- | --- | --- | --- | --- | --- | --- | --- |
|  | No. | STEEL No. | OXIDATION DEGREE (—) | ANNEALING TEMPERATURE (° C.) | HOLDING TIME (sec) | MgO/ (MgO + Al$_2$O$_3$) (mass %) | HYDRATION WATER (mass %) |
| COMPARATIVE EXAMPLE | b9 | A12 | 0.60 | 840 | 60 | 30 | 3.0 |
|  | b10 | A12 | 0.60 | 840 | 60 | 30 | 1.0 |
|  | b11 | A12 | 0.60 | 840 | 60 | 30 | 1.0 |
|  | b12 | A12 | 0.60 | 840 | 60 | 30 | 1.0 |
|  | b13 | A12 | 0.60 | 840 | 60 | 30 | 1.0 |
|  | b14 | A12 | 0.60 | 840 | 60 | 30 | 1.0 |
|  | b15 | A12 | 0.60 | 840 | 60 | 30 | 1.0 |
|  | b16 | A12 | 0.60 | 840 | 60 | 30 | 1.0 |
|  | b17 | A12 | 0.60 | 840 | 60 | 30 | 1.0 |
|  | b18 | A12 | 0.60 | 840 | 60 | 30 | 1.0 |
|  | b19 | A12 | 0.60 | 840 | 60 | 30 | 1.0 |
|  | b20 | A12 | 0.60 | 840 | 60 | 30 | 1.0 |
|  | b21 | A12 | 0.60 | 840 | 60 | 30 | 1.0 |

TABLE 4-continued

| | | DECARBURIZATION ANNEALING PROCESS | | | ANNEALING SEPARATOR APPLYING PROCESS | |
|---|---|---|---|---|---|---|
| No. | STEEL No. | OXIDATION DEGREE (—) | ANNEALING TEMPERATURE (° C.) | HOLDING TIME (sec) | MgO/ (MgO + Al$_2$O$_3$) (mass %) | HYDRATION WATER (mass %) |
| b22 | a1 | 0.60 | 840 | 60 | 30 | 1.0 |
| b23 | a2 | 0.60 | 840 | 60 | 30 | 1.0 |
| b24 | a3 | 0.60 | 840 | 60 | 30 | 1.0 |
| b25 | a4 | — | — | — | — | — |
| b26 | a5 | 0.60 | 840 | 60 | 30 | 1.0 |
| b27 | a6 | 0.60 | 840 | 60 | 30 | 1.0 |
| b28 | a7 | 0.60 | 840 | 60 | 30 | 1.0 |
| b29 | a8 | 0.60 | 840 | 60 | 30 | 1.0 |
| b30 | a9 | 0.60 | 840 | 60 | 30 | 1.0 |
| b31 | a10 | 0.60 | 840 | 60 | 30 | 1.0 |
| b32 | a11 | 0.60 | 840 | 60 | 30 | 1.0 |
| b33 | a10 | 0.60 | 840 | 60 | 30 | 1.0 |

TABLE 5

| | | | FINAL ANNEALING PROCESS | | | ANNEALING SEPARATOR REMOVING PROCESS | | |
|---|---|---|---|---|---|---|---|---|
| | No. | STEEL No. | TEMPERATURE (° C.) | ATMOSPHERIC GAS ※1 (vol %) | HOLDING TIME (h) | TYPE OF SOLUTION | PICKLING (YES OR NO) | AMOUNT OF HYDROXIDE ※2 (g/m$^2$) |
| INVENTIVE EXAMPLE | B1 | A12 | 1200 | 75 | 20 | TRIETHANOLAMINE | YES | 0.2 |
| | B2 | A12 | 1200 | 75 | 20 | TRIETHANOLAMINE | YES | 0.2 |
| | B3 | A12 | 1200 | 75 | 20 | TRIETHANOLAMINE | YES | 0.2 |
| | B4 | A12 | 1200 | 75 | 20 | TRIETHANOLAMINE | YES | 0.2 |
| | B5 | A12 | 1200 | 75 | 20 | TRIETHANOLAMINE | YES | 0.2 |
| | B6 | A12 | 1200 | 75 | 20 | TRIETHANOLAMINE | YES | 0.2 |
| | B7 | A12 | 1200 | 75 | 20 | TRIETHANOLAMINE | YES | 0.2 |
| | B8 | A12 | 1200 | 75 | 20 | TRIETHANOLAMINE | YES | 0.2 |
| | B9 | A12 | 1200 | 75 | 20 | TRIETHANOLAMINE | YES | 0.2 |
| | B10 | A12 | 1200 | 50 | 20 | TRIETHANOLAMINE | YES | 0.2 |
| | B11 | A12 | 1200 | 75 | 10 | TRIETHANOLAMINE | YES | 0.2 |
| | B12 | A12 | 1200 | 75 | 20 | TRIETHANOLAMINE | YES | 0.2 |
| | B13 | A12 | 1200 | 75 | 20 | TRIETHANOLAMINE | YES | 0.2 |
| | B14 | A12 | 1200 | 75 | 20 | TRIETHANOLAMINE | YES | 0.2 |
| | B15 | A12 | 1200 | 75 | 20 | TRIETHANOLAMINE | YES | 0.2 |
| | B16 | A12 | 1200 | 75 | 20 | TRIETHANOLAMINE | YES | 0.9 |
| | B17 | A12 | 1200 | 75 | 20 | ROSINAMINE | YES | 0.9 |
| | B18 | A12 | 1200 | 75 | 20 | MERCAPTAN | YES | 0.9 |
| | B19 | A12 | 1200 | 75 | 20 | TRIETHANOLAMINE | YES | 0.2 |
| | B20 | A12 | 1200 | 75 | 20 | TRIETHANOLAMINE | YES | 0.2 |
| | B21 | A12 | 1200 | 75 | 20 | TRIETHANOLAMINE | YES | 0.2 |
| | B22 | A12 | 1200 | 75 | 20 | TRIETHANOLAMINE | YES | 0.2 |
| | B23 | A12 | 1200 | 75 | 20 | TRIETHANOLAMINE | YES | 0.2 |
| | B24 | A12 | 1200 | 75 | 20 | TRIETHANOLAMINE | YES | 0.2 |
| | B25 | A12 | 1200 | 75 | 20 | TRIETHANOLAMINE | YES | 0.2 |
| | B26 | A13 | 1200 | 75 | 20 | TRIETHANOLAMINE | YES | 0.2 |
| | B27 | A13 | 1200 | 75 | 20 | TRIETHANOLAMINE | YES | 0.2 |

※1: MIXED GAS ATMOSPHERE OF HYDROGEN AND NITROGEN (SHOWN AS NITROGEN FRACTION)
※2: AMOUNT OF IRON HYDROXIDE AND IRON OXIDE (PER A SIDE)

TABLE 6

| | | | FINAL ANNEALING PROCESS | | | ANNEALING SEPARATOR REMOVING PROCESS | | |
|---|---|---|---|---|---|---|---|---|
| | No. | STEEL No. | TEMPERATURE (° C.) | ATMOSPHERIC GAS ※1 (vol %) | HOLDING TIME (h) | TYPE OF SOLUTION | PICKLING (YES OR NO) | AMOUNT OF HYDROXIDE ※2 (g/m$^2$) |
| INVENTIVE EXAMPLE | B28 | A13 | 1200 | 75 | 20 | TRIETHANOLAMINE | YES | 0.2 |
| | B29 | A12 | 1200 | 75 | 20 | TRIETHANOLAMINE | YES | 0.2 |
| | B30 | A12 | 1200 | 75 | 20 | TRIETHANOLAMINE | YES | 0.2 |
| | B31 | A12 | 1200 | 75 | 20 | TRIETHANOLAMINE | YES | 0.2 |
| | B32 | A13 | 1200 | 75 | 20 | TRIETHANOLAMINE | YES | 0.2 |

TABLE 6-continued

| | No. | STEEL No. | FINAL ANNEALING PROCESS | | | ANNEALING SEPARATOR REMOVING PROCESS | | |
|---|---|---|---|---|---|---|---|---|
| | | | TEMPERATURE (° C.) | ATMOSPHERIC GAS ※1 (vol %) | HOLDING TIME (h) | TYPE OF SOLUTION | PICKLING (YES OR NO) | AMOUNT OF HYDROXIDE ※2 (g/m²) |
| | B33 | A13 | 1200 | 75 | 20 | TRIETHANOLAMINE | YES | 0.2 |
| | B34 | A13 | 1200 | 75 | 20 | TRIETHANOLAMINE | YES | 0.2 |
| | B35 | A1 | 1200 | 75 | 20 | TRIETHANOLAMINE | YES | 0.2 |
| | B36 | A2 | 1200 | 75 | 20 | TRIETHANOLAMINE | YES | 0.2 |
| | B37 | A3 | 1100 | 75 | 20 | TRIETHANOLAMINE | YES | 0.2 |
| | B38 | A4 | 1200 | 75 | 20 | TRIETHANOLAMINE | YES | 0.2 |
| | B39 | A5 | 1200 | 75 | 20 | TRIETHANOLAMINE | YES | 0.2 |
| | B40 | A6 | 1200 | 75 | 20 | TRIETHANOLAMINE | YES | 0.2 |
| | B41 | A7 | 1200 | 75 | 20 | TRIETHANOLAMINE | YES | 0.2 |
| | B42 | A8 | 1200 | 75 | 20 | TRIETHANOLAMINE | YES | 0.2 |
| | B43 | A9 | 1200 | 75 | 20 | TRIETHANOLAMINE | YES | 0.2 |
| | B44 | A10 | 1200 | 75 | 20 | TRIETHANOLAMINE | YES | 0.2 |
| | B45 | A11 | 1200 | 75 | 20 | TRIETHANOLAMINE | YES | 0.2 |
| | B46 | A12 | 1200 | 75 | 20 | TRIETHANOLAMINE | YES | 0.2 |
| COMPARATIVE EXAMPLE | b1 | A12 | 1200 | 75 | 20 | TRIETHANOLAMINE | YES | 0.2 |
| | b2 | A12 | 1200 | 75 | 20 | TRIETHANOLAMINE | YES | 0.2 |
| | b3 | A12 | 1200 | 75 | 20 | TRIETHANOLAMINE | YES | 0.2 |
| | b4 | A12 | 1200 | 75 | 20 | TRIETHANOLAMINE | YES | 0.2 |
| | b5 | A12 | 1200 | 75 | 20 | TRIETHANOLAMINE | YES | 0.2 |
| | b6 | A12 | 1200 | 75 | 20 | TRIETHANOLAMINE | YES | 0.2 |
| | b7 | A12 | 1200 | 75 | 20 | TRIETHANOLAMINE | YES | 0.2 |
| | b8 | A12 | 1200 | 75 | 20 | TRIETHANOLAMINE | YES | 0.2 |

※1: MIXED GAS ATMOSPHERE OF HYDROGEN AND NITROGEN (SHOWN AS NITROGEN FRACTION)
※2: AMOUNT OF IRON HYDROXIDE AND IRON OXIDE (PER A SIDE)

TABLE 7

| | No. | STEEL No. | FINAL ANNEALING PROCESS | | | ANNEALING SEPARATOR REMOVING PROCESS | | |
|---|---|---|---|---|---|---|---|---|
| | | | TEMPERATURE (° C.) | ATMOSPHERIC GAS ※1 (vol %) | HOLDING TIME (h) | TYPE OF SOLUTION | PICKLING (YES OR NO) | AMOUNT OF HYDROXIDE ※2 (g/m²) |
| COMPARATIVE EXAMPLE | b9 | A12 | 1200 | 75 | 20 | TRIETHANOLAMINE | YES | 0.2 |
| | b10 | A12 | 1200 | 30 | 20 | TRIETHANOLAMINE | YES | 0.2 |
| | b11 | A12 | 1200 | 75 | 5 | TRIETHANOLAMINE | YES | 0.2 |
| | b12 | A12 | 1200 | 75 | 20 | TRIETHANOLAMINE | YES | 0.2 |
| | b13 | A12 | 1200 | 75 | 20 | TRIETHANOLAMINE | YES | 0.2 |
| | b14 | A12 | 1200 | 75 | 20 | TRIETHANOLAMINE | YES | 0.2 |
| | b15 | A12 | 1200 | 75 | 20 | TRIETHANOLAMINE | NO | 1.5 |
| | b16 | A12 | 1200 | 75 | 20 | ROSINAMINE | NO | 1.5 |
| | b17 | A12 | 1200 | 75 | 20 | MERCAPTAN | NO | 1.5 |
| | b18 | A12 | 1200 | 75 | 20 | TRIETHANOLAMINE | YES | 0.2 |
| | b19 | A12 | 1200 | 75 | 20 | TRIETHANOLAMINE | YES | 0.2 |
| | b20 | A12 | 1200 | 75 | 20 | TRIETHANOLAMINE | YES | 0.2 |
| | b21 | A12 | 1200 | 75 | 20 | TRIETHANOLAMINE | YES | 0.2 |
| | b22 | a1 | 1200 | 75 | 20 | TRIETHANOLAMINE | YES | 0.2 |
| | b23 | a2 | 1200 | 75 | 20 | TRIETHANOLAMINE | YES | 0.2 |
| | b24 | a3 | 1100 | 75 | 20 | TRIETHANOLAMINE | YES | 0.2 |
| | b25 | a4 | — | — | — | — | — | — |
| | b26 | a5 | 1200 | 75 | 20 | TRIETHANOLAMINE | YES | 0.2 |
| | b27 | a6 | 1200 | 75 | 20 | TRIETHANOLAMINE | YES | 0.2 |
| | b28 | a7 | 1200 | 75 | 20 | TRIETHANOLAMINE | YES | 0.2 |
| | b29 | a8 | 1200 | 75 | 20 | TRIETHANOLAMINE | YES | 0.2 |
| | b30 | a9 | 1200 | 75 | 20 | TRIETHANOLAMINE | YES | 0.2 |
| | b31 | a10 | 1200 | 75 | 20 | TRIETHANOLAMINE | YES | 0.2 |
| | b32 | a11 | 1200 | 75 | 20 | TRIETHANOLAMINE | YES | 0.2 |
| | b33 | a10 | 1200 | 75 | 20 | TRIETHANOLAMINE | YES | 0.2 |

※1: MIXED GAS ATMOSPHERE OF HYDROGEN AND NITROGEN (SHOWN AS NITROGEN FRACTION)
※2: AMOUNT OF IRON HYDROXIDE AND IRON OXIDE (PER A SIDE)

TABLE 8

| | | | SMOOTHING PROCESS | | INSULATION COATING FORMING PROCESS | |
| | | | | | | HEAT TREATMENT |
| | | | ATMOSPHERIC GAS | ANNEALING | BAKING | |
| | No. | STEEL No. | TYPE OF GAS | VOLUME FRACTION | TEMPERATURE (°C.) | TEMPERATURE (°C.) | TEMPERATURE (°C.) |
|---|---|---|---|---|---|---|---|
| INVENTIVE EXAMPLE | B1 | A12 | $H_2$ | 100 | 1200 | 400 | 850 |
| | B2 | A12 | $H_2$ | 100 | 1200 | 400 | 850 |
| | B3 | A12 | $H_2$ | 100 | 1200 | 400 | 850 |
| | B4 | A12 | $H_2$ | 100 | 1200 | 400 | 850 |
| | B5 | A12 | $H_2$ | 100 | 1200 | 400 | 850 |
| | B6 | A12 | $H_2$ | 100 | 1200 | 400 | 850 |
| | B7 | A12 | $H_2$ | 100 | 1200 | 400 | 850 |
| | B8 | A12 | $H_2$ | 100 | 1200 | 400 | 850 |
| | B9 | A12 | $H_2$ | 100 | 1200 | 400 | 850 |
| | B10 | A12 | $H_2$ | 100 | 1200 | 400 | 850 |
| | B11 | A12 | $H_2$ | 100 | 1200 | 400 | 870 |
| | B12 | A12 | CO | 100 | 1200 | 400 | 870 |
| | B13 | A12 | $CO/N_2$ | 50/50 | 1200 | 400 | 870 |
| | B14 | A12 | $H_2/N_2$ | 50/50 | 1200 | 400 | 870 |
| | B15 | A12 | $H_2$ | 100 | 1000 | 450 | 870 |
| | B16 | A12 | $H_2$ | 100 | 1200 | 450 | 870 |
| | B17 | A12 | $H_2$ | 100 | 1200 | 450 | 870 |
| | B18 | A12 | $H_2$ | 100 | 1200 | 450 | 870 |
| | B19 | A12 | $H_2$ | 100 | 1200 | 350 | 870 |
| | B20 | A12 | $H_2$ | 100 | 1200 | 600 | 870 |
| | B21 | A12 | $H_2$ | 100 | 1200 | 450 | 800 |
| | B22 | A12 | $H_2$ | 100 | 1200 | 450 | 1000 |
| | B23 | A12 | $H_2$ | 100 | 1200 | 450 | 850 |
| | B24 | A12 | $H_2$ | 100 | 1200 | 450 | 850 |
| | B25 | A12 | $H_2$ | 100 | 1200 | 450 | 850 |
| | B26 | A13 | $H_2$ | 100 | 1200 | 450 | 850 |
| | B27 | A13 | $H_2$ | 100 | 1200 | 450 | 850 |

TABLE 9

| | | | SMOOTHING PROCESS | | INSULATION COATING FORMING PROCESS | |
| | | | | | | HEAT TREATMENT |
| | | | ATMOSPHERIC GAS | ANNEALING | BAKING | |
| | No. | STEEL No. | TYPE OF GAS | VOLUME FRACTION | TEMPERATURE (°C.) | TEMPERATURE (°C.) | TEMPERATURE (°C.) |
|---|---|---|---|---|---|---|---|
| INVENTIVE EXAMPLE | B28 | A13 | $H_2$ | 100 | 1200 | 450 | 850 |
| | B29 | A12 | $H_2$ | 100 | 1200 | 450 | 870 |
| | B30 | A12 | $H_2$ | 100 | 1200 | 400 | 870 |
| | B31 | A12 | $H_2$ | 100 | 1200 | 400 | 850 |
| | B32 | A13 | $H_2$ | 100 | 1200 | 450 | 870 |
| | B33 | A13 | $H_2$ | 100 | 1200 | 400 | 850 |
| | B34 | A13 | $H_2$ | 100 | 1200 | 400 | 850 |
| | B35 | A1 | $H_2$ | 100 | 1200 | 400 | 870 |
| | B36 | A2 | $H_2$ | 100 | 1200 | 400 | 870 |
| | B37 | A3 | $H_2$ | 100 | 1200 | 400 | 870 |
| | B38 | A4 | $H_2$ | 100 | 1200 | 400 | 870 |
| | B39 | A5 | $H_2$ | 100 | 1200 | 400 | 870 |
| | B40 | A6 | $H_2$ | 100 | 1200 | 400 | 870 |
| | B41 | A7 | $H_2$ | 100 | 1200 | 400 | 870 |
| | B42 | A8 | $H_2$ | 100 | 1200 | 400 | 870 |
| | B43 | A9 | $H_2$ | 100 | 1200 | 400 | 870 |
| | B44 | A10 | $H_2$ | 100 | 1200 | 400 | 870 |
| | B45 | A11 | $H_2$ | 100 | 1200 | 400 | 870 |
| | B46 | A12 | $H_2$ | 100 | 1200 | 400 | 870 |
| COMPARATIVE EXAMPLE | b1 | A12 | $H_2$ | 100 | 1200 | 400 | 850 |
| | b2 | A12 | $H_2$ | 100 | 1200 | 400 | 850 |
| | b3 | A12 | $H_2$ | 100 | 1200 | 400 | 850 |
| | b4 | A12 | $H_2$ | 100 | 1200 | 400 | 850 |
| | b5 | A12 | $H_2$ | 100 | 1200 | 400 | 850 |
| | b6 | A12 | $H_2$ | 100 | 1200 | 400 | 850 |
| | b7 | A12 | $H_2$ | 100 | 1200 | 400 | 850 |
| | b8 | A12 | $H_2$ | 100 | 1200 | 400 | 850 |

TABLE 10

| | No. | STEEL No. | SMOOTHING PROCESS | | ANNEALING TEMPERATURE (° C.) | INSULATION COATING FORMING PROCESS | |
|---|---|---|---|---|---|---|---|
| | | | ATMOSPHERIC GAS | | | BAKING TEMPERATURE (° C.) | HEAT TREATMENT TEMPERATURE (° C.) |
| | | | TYPE OF GAS | VOLUME FRACTION | | | |
| COMPARATIVE EXAMPLE | b9 | A12 | H$_2$ | 100 | 1200 | 400 | 850 |
| | b10 | A12 | H$_2$ | 100 | 1200 | 400 | 850 |
| | b11 | A12 | H$_2$ | 100 | 1200 | 400 | 850 |
| | b12 | A12 | CO/N$_2$ | 30/70 | 1200 | 400 | 850 |
| | b13 | A12 | H$_2$/N$_2$ | 30/70 | 1200 | 400 | 850 |
| | b14 | A12 | H$_2$ | 100 | 800 | 400 | 850 |
| | b15 | A12 | H$_2$ | 100 | 1200 | 400 | 850 |
| | b16 | A12 | H$_2$ | 100 | 1200 | 400 | 850 |
| | b17 | A12 | H$_2$ | 100 | 1200 | 400 | 850 |
| | b18 | A12 | H$_2$ | 100 | 1200 | 300 | 850 |
| | b19 | A12 | H$_2$ | 100 | 1200 | 800 | 850 |
| | b20 | A12 | H$_2$ | 100 | 1200 | 400 | 700 |
| | b21 | A12 | H$_2$ | 100 | 1200 | 400 | 1050 |
| | b22 | a1 | H$_2$ | 100 | 1200 | 400 | 870 |
| | b23 | a2 | H$_2$ | 100 | 1200 | 400 | 870 |
| | b24 | a3 | H$_2$ | 100 | 1200 | 400 | 870 |
| | b25 | a4 | — | — | — | — | — |
| | b26 | a5 | H$_2$ | 100 | 1200 | 400 | 870 |
| | b27 | a6 | H$_2$ | 100 | 1200 | 400 | 870 |
| | b28 | a7 | H$_2$ | 100 | 1200 | 400 | 870 |
| | b29 | a8 | H$_2$ | 100 | 1200 | 400 | 870 |
| | b30 | a9 | H$_2$ | 100 | 1200 | 400 | 870 |
| | b31 | a10 | H$_2$ | 100 | 1200 | 400 | 870 |
| | b32 | a11 | H$_2$ | 100 | 1200 | 400 | 870 |
| | b33 | a10 | H$_2$ | 100 | 1200 | 400 | 870 |

TABLE 11

| | No. | STEEL No. | MAGNETIC DOMAIN REFINEMENT | | IRON LOSS W17/50 (W/kg) | COATING ADHESION |
|---|---|---|---|---|---|---|
| | | | TIMING FOR CONTROLLING | METHOD | | |
| INVENTIVE EXAMPLE | B1 | A12 | FOURTH | LASER IRRADIATION | 0.68 | ○ |
| | B2 | A12 | FOURTH | LASER IRRADIATION | 0.69 | ○ |
| | B3 | A12 | FOURTH | LASER IRRADIATION | 0.68 | ○ |
| | B4 | A12 | FOURTH | LASER IRRADIATION | 0.69 | ○ |
| | B5 | A12 | FOURTH | LASER IRRADIATION | 0.69 | ○ |
| | B6 | A12 | FOURTH | LASER IRRADIATION | 0.68 | ○ |
| | B7 | A12 | FOURTH | LASER IRRADIATION | 0.69 | ○ |
| | B8 | A12 | FOURTH | LASER IRRADIATION | 0.69 | ○ |
| | B9 | A12 | FOURTH | LASER IRRADIATION | 0.69 | ○ |
| | B10 | A12 | FOURTH | LASER IRRADIATION | 0.68 | ○ |
| | B11 | A12 | FOURTH | LASER IRRADIATION | 0.68 | ○ |
| | B12 | A12 | FOURTH | LASER IRRADIATION | 0.67 | ○ |
| | B13 | A12 | FOURTH | LASER IRRADIATION | 0.69 | ○ |
| | B14 | A12 | FOURTH | LASER IRRADIATION | 0.67 | ○ |
| | B15 | A12 | FOURTH | LASER IRRADIATION | 0.68 | ○ |
| | B16 | A12 | FOURTH | LASER IRRADIATION | 0.68 | ○ |
| | B17 | A12 | FOURTH | LASER IRRADIATION | 0.69 | ○ |

TABLE 11-continued

| No. | STEEL No. | MAGNETIC DOMAIN REFINEMENT TIMING FOR CONTROLLING | METHOD | IRON LOSS W17/50 (W/kg) | COATING ADHESION |
|---|---|---|---|---|---|
| B18 | A12 | FOURTH | LASER IRRADIATION | 0.68 | ○ |
| B19 | A12 | FOURTH | LASER IRRADIATION | 0.68 | ○ |
| B20 | A12 | FOURTH | LASER IRRADIATION | 0.67 | ○ |
| B21 | A12 | FOURTH | LASER IRRADIATION | 0.69 | ○ |
| B22 | A12 | FOURTH | LASER IRRADIATION | 0.69 | ○ |
| B23 | A12 | FIRST | MECHANICAL GROOVE FORMING | 0.65 | ◎ |
| B24 | A12 | SECOND | MECHANICAL GROOVE FORMING | 0.64 | ◎ |
| B25 | A12 | THIRD | MECHANICAL GROOVE FORMING | 0.65 | ◎ |
| B26 | A13 | FIRST | CHEMICAL GROOVE FORMING | 0.67 | ◎ |
| B27 | A13 | SECOND | CHEMICAL GROOVE FORMING | 0.66 | ◎ |

TABLE 12

| | No. | STEEL No. | MAGNETIC DOMAIN REFINEMENT TIMING FOR CONTROLLING | METHOD | IRON LOSS W17/50 (W/kg) | COATING ADHESION |
|---|---|---|---|---|---|---|
| INVENTIVE EXAMPLE | B28 | A13 | THIRD | CHEMICAL GROOVE FORMING | 0.64 | ◎ |
| | B29 | A12 | FOURTH | LASER IRRADIATION | 0.63 | ◎ |
| | B30 | A12 | FOURTH | LASER IRRADIATION | 0.65 | ◎ |
| | B31 | A12 | FOURTH | LASER IRRADIATION | 0.64 | ◎ |
| | B32 | A13 | FOURTH | LASER IRRADIATION | 0.65 | ◎ |
| | B33 | A13 | FOURTH | LASER IRRADIATION | 0.66 | ◎ |
| | B34 | A13 | FOURTH | LASER IRRADIATION | 0.64 | ◎ |
| | B35 | A1 | FOURTH | LASER IRRADIATION | 0.68 | ○ |
| | B36 | A2 | FOURTH | LASER IRRADIATION | 0.69 | ○ |
| | B37 | A3 | FOURTH | LASER IRRADIATION | 0.68 | ○ |
| | B38 | A4 | FOURTH | LASER IRRADIATION | 0.67 | ○ |
| | B39 | A5 | FOURTH | LASER IRRADIATION | 0.66 | ○ |
| | B40 | A6 | FOURTH | LASER IRRADIATION | 0.68 | ○ |
| | B41 | A7 | FOURTH | LASER IRRADIATION | 0.69 | ○ |
| | B42 | A8 | FOURTH | LASER IRRADIATION | 0.68 | ○ |
| | B43 | A9 | FOURTH | LASER IRRADIATION | 0.69 | ○ |
| | B44 | A10 | FOURTH | LASER IRRADIATION | 0.67 | ○ |
| | B45 | A11 | FOURTH | LASER IRRADIATION | 0.68 | ○ |
| | B46 | A12 | NO | — | 0.95 | ◎ |
| COMPARATIVE EXAMPLE | b1 | A12 | FOURTH | LASER IRRADIATION | 1.16 | Δ |
| | b2 | A12 | FOURTH | LASER IRRADIATION | 1.08 | Δ |
| | b3 | A12 | FOURTH | LASER IRRADIATION | 1.45 | Δ |

TABLE 12-continued

| | No. | STEEL No. | MAGNETIC DOMAIN REFINEMENT TIMING FOR CONTROLLING | METHOD | IRON LOSS W17/50 (W/kg) | COATING ADHESION |
|---|---|---|---|---|---|---|
| | b4 | A12 | FOURTH | LASER IRRADIATION | 1.27 | Δ |
| | b5 | A12 | FOURTH | LASER IRRADIATION | 1.16 | Δ |
| | b6 | A12 | FOURTH | LASER IRRADIATION | 0.94 | Δ |
| | b7 | A12 | FOURTH | LASER IRRADIATION | 1.02 | Δ |
| | b8 | A12 | FOURTH | LASER IRRADIATION | 0.97 | Δ |

TABLE 13

| | No. | STEEL No. | MAGNETIC DOMAIN REFINEMENT TIMING FOR CONTROLLING | METHOD | IRON LOSS W17/50 (W/kg) | COATING ADHESION |
|---|---|---|---|---|---|---|
| COMPARATIVE EXAMPLE | b9 | A12 | FOURTH | LASER IRRADIATION | 0.84 | Δ |
| | b10 | A12 | FOURTH | LASER IRRADIATION | 1.04 | Δ |
| | b11 | A12 | FOURTH | LASER IRRADIATION | 1.08 | Δ |
| | b12 | A12 | FOURTH | LASER IRRADIATION | 1.10 | Δ |
| | b13 | A12 | FOURTH | LASER IRRADIATION | 1.07 | Δ |
| | b14 | A12 | FOURTH | LASER IRRADIATION | 1.06 | Δ |
| | b15 | A12 | FOURTH | LASER IRRADIATION | 1.12 | Δ |
| | b16 | A12 | FOURTH | LASER IRRADIATION | 1.15 | Δ |
| | b17 | A12 | FOURTH | LASER IRRADIATION | 1.13 | Δ |
| | b18 | A12 | FOURTH | LASER IRRADIATION | 0.82 | X |
| | b19 | A12 | FOURTH | LASER IRRADIATION | 0.85 | X |
| | b20 | A12 | FOURTH | LASER IRRADIATION | 0.78 | X |
| | b21 | A12 | FOURTH | LASER IRRADIATION | 0.81 | X |
| | b22 | a1 | FOURTH | LASER IRRADIATION | 0.79 | ○ |
| | b23 | a2 | FOURTH | LASER IRRADIATION | 0.78 | ○ |
| | b24 | a3 | FOURTH | LASER IRRADIATION | 0.76 | ○ |
| | b25 | a4 | — | — | — | — |
| | b26 | a5 | FOURTH | LASER IRRADIATION | 0.95 | ○ |
| | b27 | a6 | FOURTH | LASER IRRADIATION | 1.12 | ○ |
| | b28 | a7 | FOURTH | LASER IRRADIATION | 1.05 | ○ |
| | b29 | a8 | FOURTH | LASER IRRADIATION | 1.06 | ○ |
| | b30 | a9 | FOURTH | LASER IRRADIATION | 0.97 | ○ |
| | b31 | a10 | FOURTH | LASER IRRADIATION | 1.08 | ○ |
| | b32 | a11 | FOURTH | LASER IRRADIATION | 0.93 | ○ |
| | b33 | a10 | NO | — | 1.38 | ○ |

As shown in Tables 1 to 13, in the inventive examples Nos. B1 to B46, all process conditions satisfied the range of the present invention, and thus, the iron loss was low. Moreover, the coating adhesion was excellent.

On the other hand, in the comparative examples Nos. b1 to b33, at least one of the process conditions was out of the range of the present invention, and thus, the iron loss and/or the coating adhesion was insufficient. Herein, in the comparative example No. b25, the rolling could not be conducted, the evaluation thereafter was not conducted.

INDUSTRIAL APPLICABILITY

According to the above aspects of the present invention, it is possible to provide the method for producing the grain oriented electrical steel sheet without the forsterite film and excellent in the magnetic characteristics and the coating adhesion. The obtained grain oriented electrical steel sheet is excellent in the magnetic characteristics and the coating adhesion, and therefore, the present invention has significant industrial applicability.

What is claimed is:

1. A method for producing a grain oriented electrical steel sheet,
    the method comprising:
    a hot rolling process of hot-rolling a steel piece to obtain a hot rolled steel sheet, the steel piece including, as a chemical composition, by mass %,
    0.030 to 0.100% of C,
    0.80 to 7.00% of Si,
    0.01 to 1.00% of Mn,
    0 to 0.060% in total of S and Se,
    0.010 to 0.065% of acid soluble Al,
    0.004 to 0.012% of N,
    0 to 0.30% of Cr,
    0 to 0.40% of Cu,
    0 to 0.50% of P,
    0 to 0.30% of Sn,
    0 to 0.30% of Sb,
    0 to 1.00% of Ni,
    0 to 0.008% of B,
    0 to 0.15% of V,
    0 to 0.20% of Nb,
    0 to 0.10% of Mo,
    0 to 0.015% of Ti,
    0 to 0.010% of Bi, and
    a balance consisting of Fe and impurities;
    a cold rolling process of cold-rolling the hot rolled steel sheet to obtain a cold rolled steel sheet;
    a decarburization annealing process of decarburization-annealing the cold rolled steel sheet to obtain a decarburization annealed sheet;
    an annealing separator applying process of applying and drying an annealing separator including $Al_2O_3$ and MgO to the decarburization annealed sheet;
    a final annealing process of final-annealing the decarburization annealed sheet after applying the annealing separator to obtain a final annealed sheet;
    an annealing separator removing process of removing a redundant annealing separator from a surface of the final annealed sheet;
    a smoothing process of smoothing the surface of the final annealed sheet after removing the redundant annealing separator; and
    an insulation coating forming process of forming an insulation coating on the surface of the final annealed sheet after being smoothed,
    wherein, in the decarburization annealing process, $PH_2O/PH_2$ which is an oxidation degree of an atmosphere is 0.18 to 0.80, an annealing temperature is 750 to 900° C., and a holding time is 10 to 600 seconds,
    wherein, in the annealing separator applying process, $MgO/(MgO+Al_2O_3)\times100$ which is a mass ratio of MgO and $Al_2O_3$ is 5 to 50%, and a hydration water is 1.5 mass % or less in the annealing separator,
    wherein, in the final annealing process,
    the decarburization annealed sheet after applying the annealing separator is held at 1100 to 1200° C. for 10 hours or more in a mixed gas atmosphere including 50 volume % or more of hydrogen,
    wherein, in the annealing separator removing process,
    the final annealed sheet is water-washed using a solution with an inhibitor which is at least one of a triethanolamine, a rosinamine, or a mercaptan,
    the final annealed sheet after water-washing is pickled using an acidic solution whose volume concentration is less than 20%, and
    an amount of an iron hydroxide and an iron oxide on the surface of the final annealed sheet is controlled to 0.9 $g/m^2$ or less per a side,
    wherein, in the smoothing process,
    the final annealed sheet after removing the redundant annealing separator and after exposing the surface thereof is annealed without applying an annealing separator at 1000° C. or more in a mixed gas atmosphere including 50 volume % or more of hydrogen or carbon monoxide, and
    wherein, in the insulation coating forming process,
    the insulation coating is formed on the surface of the final annealed sheet after being smoothed by applying an insulation coating forming solution which mainly includes a phosphate or a colloidal silica, by baking at 350 to 600° C., and then by heat-treating at 800 to 1000° C.

2. The method for producing the grain oriented electrical steel sheet according to claim 1,
    the method including, between the hot rolling process and the cold rolling process,
    at least one of a hot band annealing process of annealing the hot rolled steel sheet or a hot band pickling process of pickling the hot rolled steel sheet.

3. The method for producing the grain oriented electrical steel sheet according to claim 1,
    wherein, in the decarburization annealing process, a nitriding treatment is conducted by annealing the cold rolled steel sheet in an atmosphere including ammonia.

4. The method for producing the grain oriented electrical steel sheet according to claim 1,
    the method including, between the cold rolling process and the decarburization annealing process, between the decarburization annealing process and the annealing separator applying process, between the smoothing process and the insulation coating forming process, or after the insulation coating forming process,
    a magnetic domain refining process of conducting a magnetic domain refining treatment.

5. The method for producing the grain oriented electrical steel sheet according to claim 1,
    wherein, the steel piece includes, as the chemical composition, by mass %, at least one of
    0.02 to 0.30% of Cr,
    0.05 to 0.40% of Cu,
    0.005 to 0.50% of P,
    0.02 to 0.30% of Sn,
    0.01 to 0.30% of Sb,
    0.01 to 1.00% of Ni,
    0.0005 to 0.008% of B,
    0.002 to 0.15% of V,
    0.005 to 0.20% of Nb,
    0.005 to 0.10% of Mo,
    0.002 to 0.015% of Ti, and
    0.001 to 0.010% of Bi.

6. The method for producing the grain oriented electrical steel sheet according to claim 1,
wherein, in the decarburization annealing process,
a nitriding treatment is conducted by annealing the cold rolled steel sheet in a cooling stage after decarburization annealing in an atmosphere where an ammonia is included and an oxidation degree $PH_2O/PH_2$ is 0.0001 to 0.01.

* * * * *